United States Patent
Pfriem et al.

(10) Patent No.: US 10,757,048 B2
(45) Date of Patent: Aug. 25, 2020

(54) INTELLIGENT PERSONAL ASSISTANT AS A CONTACT

(71) Applicant: Microsoft Technology Licensing, LLC, Redmond, WA (US)

(72) Inventors: Zachary Adam Pfriem, Seattle, WA (US); Mark Jozef Vitazko, Seattle, WA (US); Jared Frew, Seattle, WA (US); Jason Michael Nelson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 15/094,120

(22) Filed: Apr. 8, 2016

(65) Prior Publication Data

US 2017/0295117 A1 Oct. 12, 2017

(51) Int. Cl.
*G06F 15/16* (2006.01)
*H04L 12/58* (2006.01)
(Continued)

(52) U.S. Cl.
CPC ......... *H04L 51/046* (2013.01); *G06Q 10/107* (2013.01); *G06Q 30/0252* (2013.01);
(Continued)

(58) Field of Classification Search
CPC ..... H04L 51/046; H04L 51/16; G06Q 10/107; G06Q 30/0252; G06Q 30/0282; G06Q 30/0631
See application file for complete search history.

(56) References Cited

U.S. PATENT DOCUMENTS 8,107,401 B2   1/2012 John et al.
8,670,979 B2   3/2014 Gruber et al.
(Continued)

FOREIGN PATENT DOCUMENTS

EP   2575128 A2   4/2013
EP   2690847 A1   1/2014
(Continued)

OTHER PUBLICATIONS

PCT International Search Report and Written Opinion in International Application PCT/US2017/025223, dated May 15, 2017, 14 pages.
(Continued)

*Primary Examiner* — Dhairya A Patel

(57) ABSTRACT

In a non-limiting example of the present disclosure, an intelligent personal assistant service may be added as an active participant within a thread of an application. A query directed to an intelligent personal assistant service may be entered into a message thread of a messaging application. An indication that the intelligent personal assistant service is added as an active participant within the message thread may be received, at a processing device. Content from the intelligent personal assistant service may be received directly into the message application. As an example, content may be provided, within the messaging application, as a message draft that may be modified before inclusion within a message thread. An input may be provided indicating to include the received content within the message thread. In response to providing the input, content received from the intelligent personal assistant service may be displayed within the message thread.

20 Claims, 24 Drawing Sheets

(51) Int. Cl.
*G06Q 30/06* (2012.01)
*G06Q 30/02* (2012.01)
*G06Q 10/10* (2012.01)

(52) U.S. Cl.
CPC ..... *G06Q 30/0282* (2013.01); *G06Q 30/0631* (2013.01); *H04L 51/16* (2013.01)

(56) References Cited

U.S. PATENT DOCUMENTS

| | | | |
|---|---|---|---|
| 9,037,578 | B2 | 5/2015 | Brust et al. |
| 9,106,599 | B2 | 8/2015 | Dandison et al. |
| 9,318,108 | B2* | 4/2016 | Gruber .................... G06F 40/40 |
| 9,483,461 | B2 | 11/2016 | Fleizach et al. |
| 9,548,050 | B2 | 1/2017 | Gruber et al. |
| 10,158,593 | B2 | 12/2018 | Pfriem et al. |
| 2003/0167167 | A1 | 9/2003 | Gong |
| 2005/0054381 | A1 | 3/2005 | Lee et al. |
| 2008/0189367 | A1 | 8/2008 | Okumura |
| 2011/0320373 | A1 | 12/2011 | Lee et al. |
| 2012/0016678 | A1* | 1/2012 | Gruber ...................... G06F 9/54 704/275 |
| 2012/0265528 | A1 | 10/2012 | Gruber et al. |
| 2013/0254139 | A1 | 9/2013 | Lei |
| 2013/0346877 | A1 | 12/2013 | Borovoy et al. |
| 2014/0040748 | A1 | 2/2014 | Lemay et al. |
| 2014/0047001 | A1 | 2/2014 | Phillips et al. |
| 2014/0136013 | A1 | 5/2014 | Wolverton et al. |
| 2014/0164509 | A1 | 6/2014 | Lynch et al. |
| 2014/0164532 | A1 | 6/2014 | Lynch et al. |
| 2014/0218372 | A1* | 8/2014 | Missig .................... G06F 3/044 345/473 |
| 2014/0365407 | A1 | 12/2014 | Brown et al. |
| 2014/0365885 | A1* | 12/2014 | Carson ................ G06F 3/04842 715/708 |
| 2015/0006149 | A1 | 1/2015 | Bonas et al. |
| 2015/0139410 | A1 | 5/2015 | Bouzid et al. |
| 2015/0162000 | A1 | 6/2015 | Di censo et al. |
| 2015/0178371 | A1 | 6/2015 | Seth et al. |
| 2015/0186156 | A1 | 7/2015 | Brown et al. |
| 2015/0194148 | A1 | 7/2015 | Wong et al. |
| 2015/0348548 | A1* | 12/2015 | Piernot .................. G10L 15/22 704/235 |
| 2015/0350123 | A1* | 12/2015 | Park ........................ H04L 51/04 715/752 |
| 2015/0373183 | A1 | 12/2015 | Woolsey et al. |
| 2016/0063874 | A1 | 3/2016 | Czerwinski et al. |
| 2016/0063989 | A1 | 3/2016 | Deleeuw |
| 2016/0077794 | A1* | 3/2016 | Kim ........................ G06F 3/165 704/275 |
| 2016/0104474 | A1 | 4/2016 | Bunn et al. |
| 2017/0026318 | A1* | 1/2017 | Daniel .................. H04L 51/046 |
| 2017/0048378 | A1 | 2/2017 | Rubinstein et al. |
| 2017/0180276 | A1 | 6/2017 | Gershony et al. |
| 2017/0180294 | A1 | 6/2017 | Milligan et al. |
| 2017/0191841 | A1 | 7/2017 | Marueli et al. |
| 2017/0295122 | A1 | 10/2017 | Pfriem et al. |
| 2017/0336926 | A1* | 11/2017 | Chaudhri .............. G06F 3/0481 |
| 2019/0081916 | A1 | 3/2019 | Pfriem et al. |

FOREIGN PATENT DOCUMENTS

| | | |
|---|---|---|
| WO | 02101483 A2 | 12/2002 |
| WO | 2014209157 A1 | 12/2014 |
| WO | 2015080563 A1 | 6/2015 |

OTHER PUBLICATIONS

Poon, et al., "Context-Linked Virtual Assistants for Distributed Teams: An Astrophysics Case Study", In Proceedings of ACM Conference on Computer Supported Cooperative Work, Nov. 8, 2008, pp. 1-10, 10 pages.

Perez, Sarah, "Emu, A Smarter Messaging App With a Built-In Assistant, Exits Beta", Published on: Apr. 2, 2014 Available at: http://techcrunch.com/2014/04/02/emu-a-smarter-messaging-app-with-a-built-in-assistant-exits-beta/, 10 pages.

Dredge, Stuart, "Facebook M virtual assistant will compete with Siri and Google Now", Published on: Aug. 27, 2015 Available at: http://www.theguardian.com/technology/2015/aug/27/facebook-m-virtual-assistant-siri-google-now, 1 page.

"Microsoft Brings Chinese Personal Assistant to WeChat", Published on: Aug. 21, 2015 Available at: http://wwwiresearchchina.com/news/6636.html, 1 page.

"Non Final Office Action Issued in U.S. Appl. No. 15/094,035", dated Nov. 28, 2017, 11 pages.

"Notice of Allowance Issued in U.S. Appl. No. 15/094,035", dated Apr. 13, 2018, 5 Pages.

Loh, et al., "Analyzing Web Chat Messages for Recommending Items from a Digital Library", In Proceedings of the 6th International Conference on Enterprise Information Systems, vol. IV, Apr. 14, 2004, 9 Pages.

"International Search Report and Written Opinion Issued in PCT Application No. PCT/US2017/025222", dated May 15, 2017, 12 Pages.

"Office Action Issued in European Patent Application No. 17717600.5", dated Jul. 29, 2019, 7 Pages.

"Office Action issued in European Patent Application No. 17717601.3", dated Jul. 29, 2019, 8 Pages.

"Non Final Office Action Issued in U.S. Appl. No. 16/188,800", dated Oct. 4, 2019, 7 Pages.

"Notice of Allowance Issued in U.S. Appl. No. 16/188,800", dated Feb. 20, 2020, 10 Pages.

"Application as Filed in U.S. Appl. No. 62/270,454", Filed Date: 2015, 76 Pages.

* cited by examiner

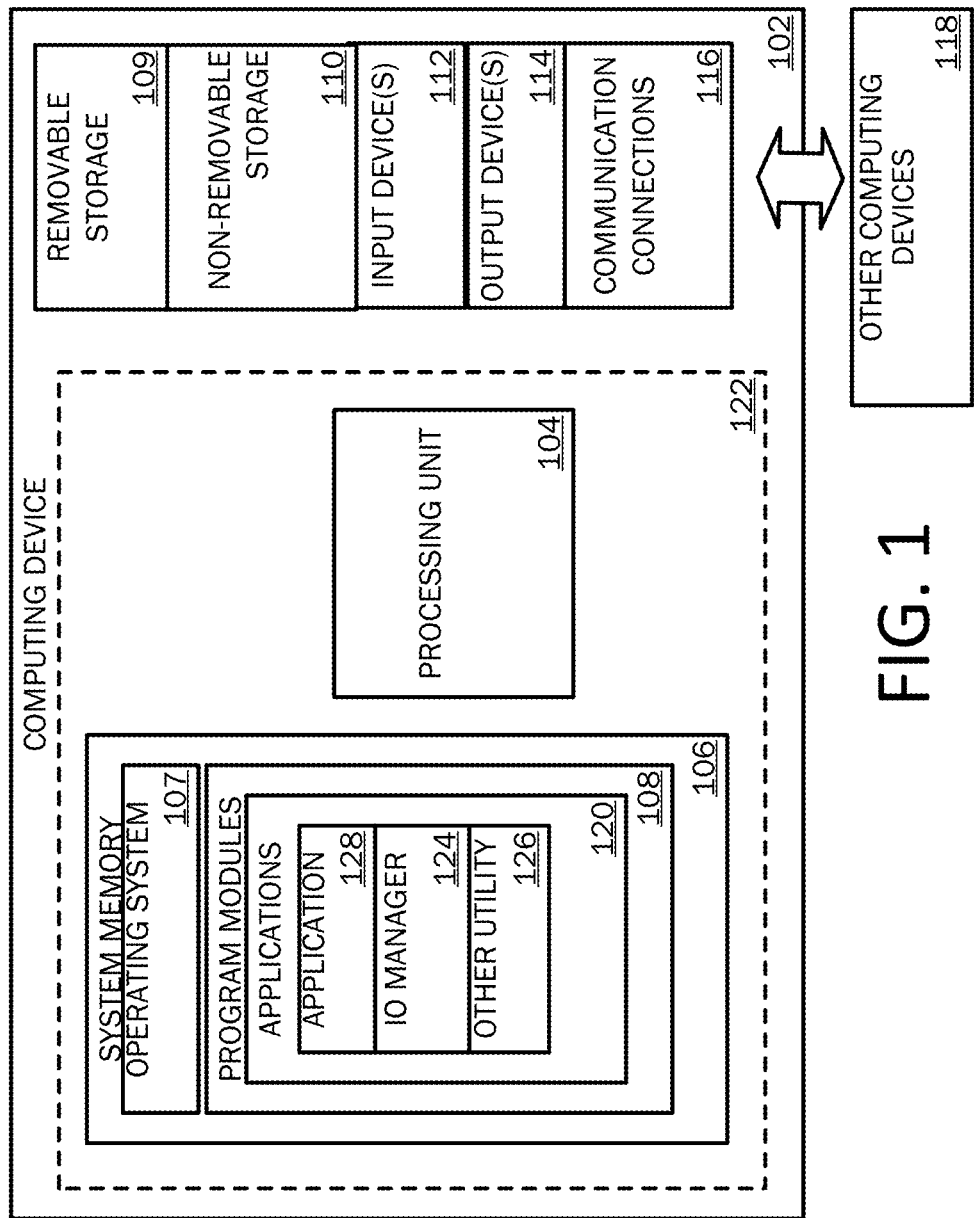

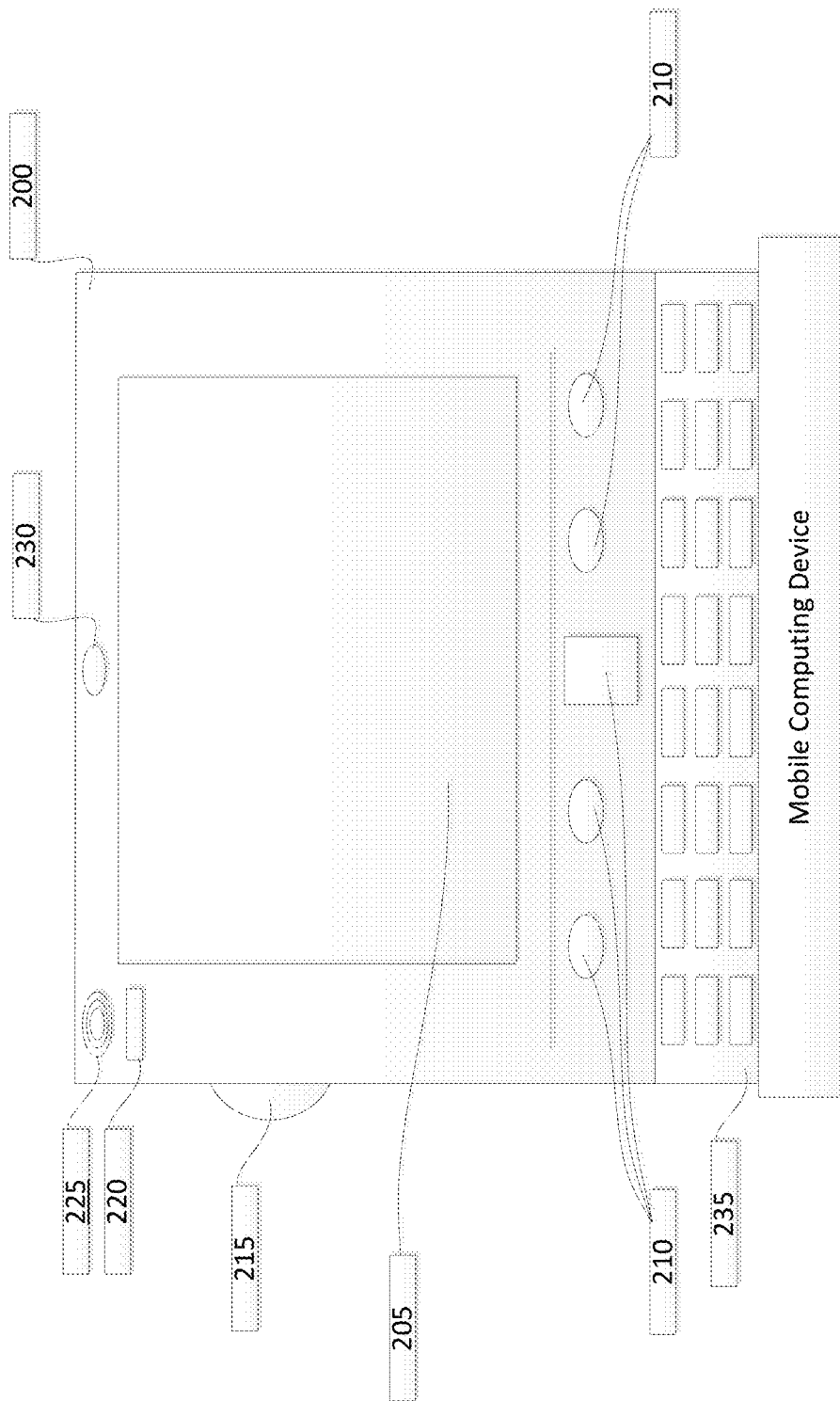

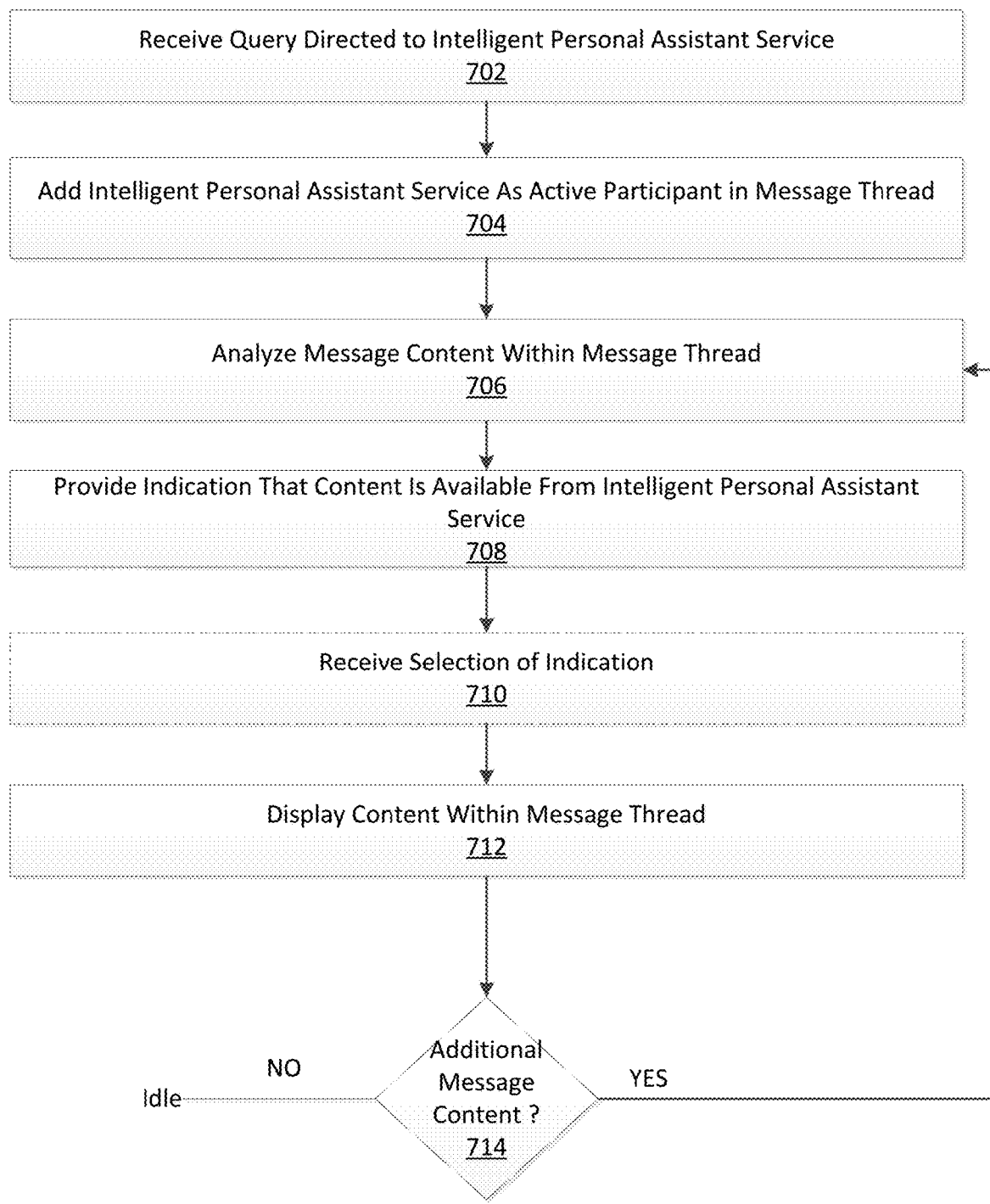

800

900

920

930

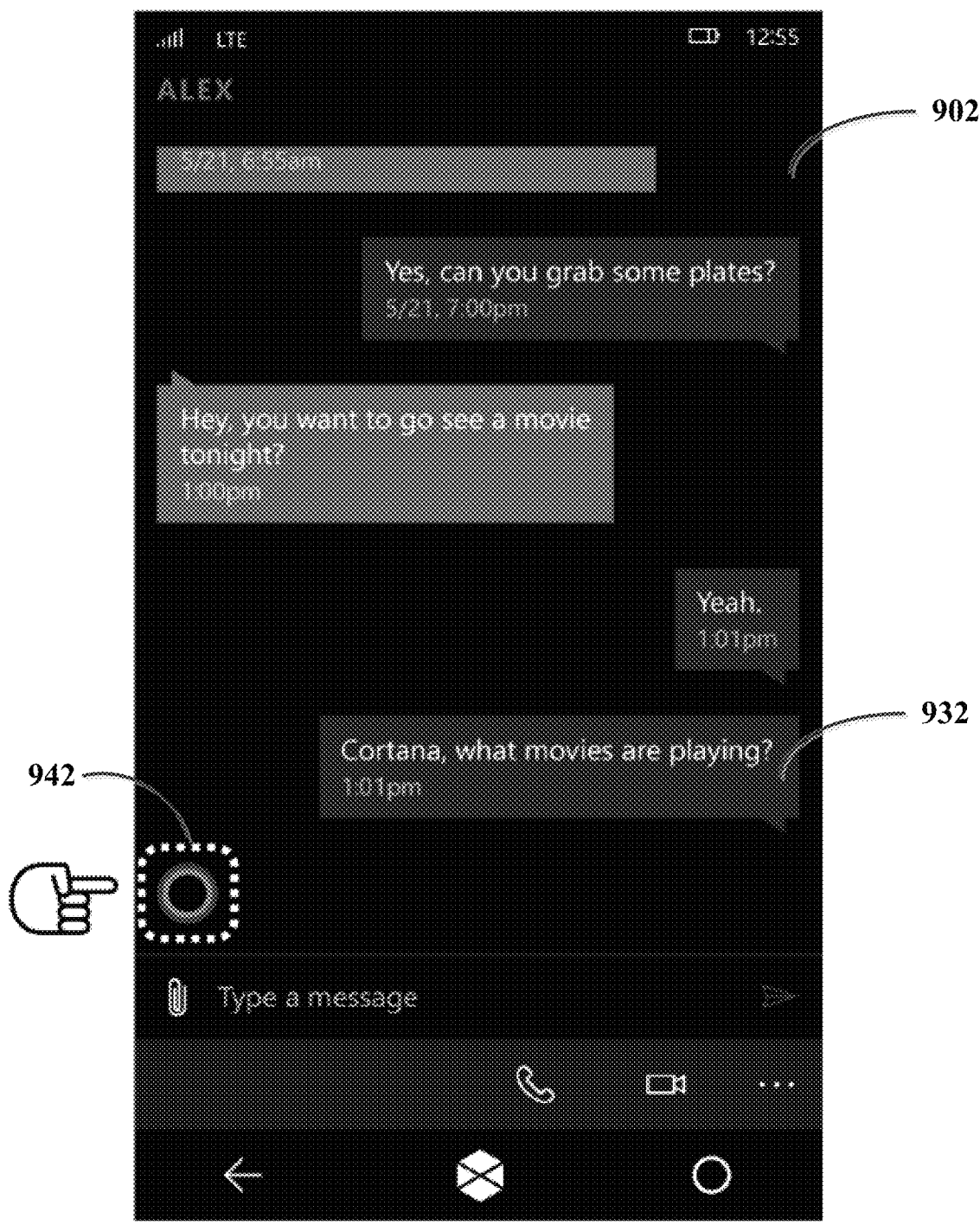

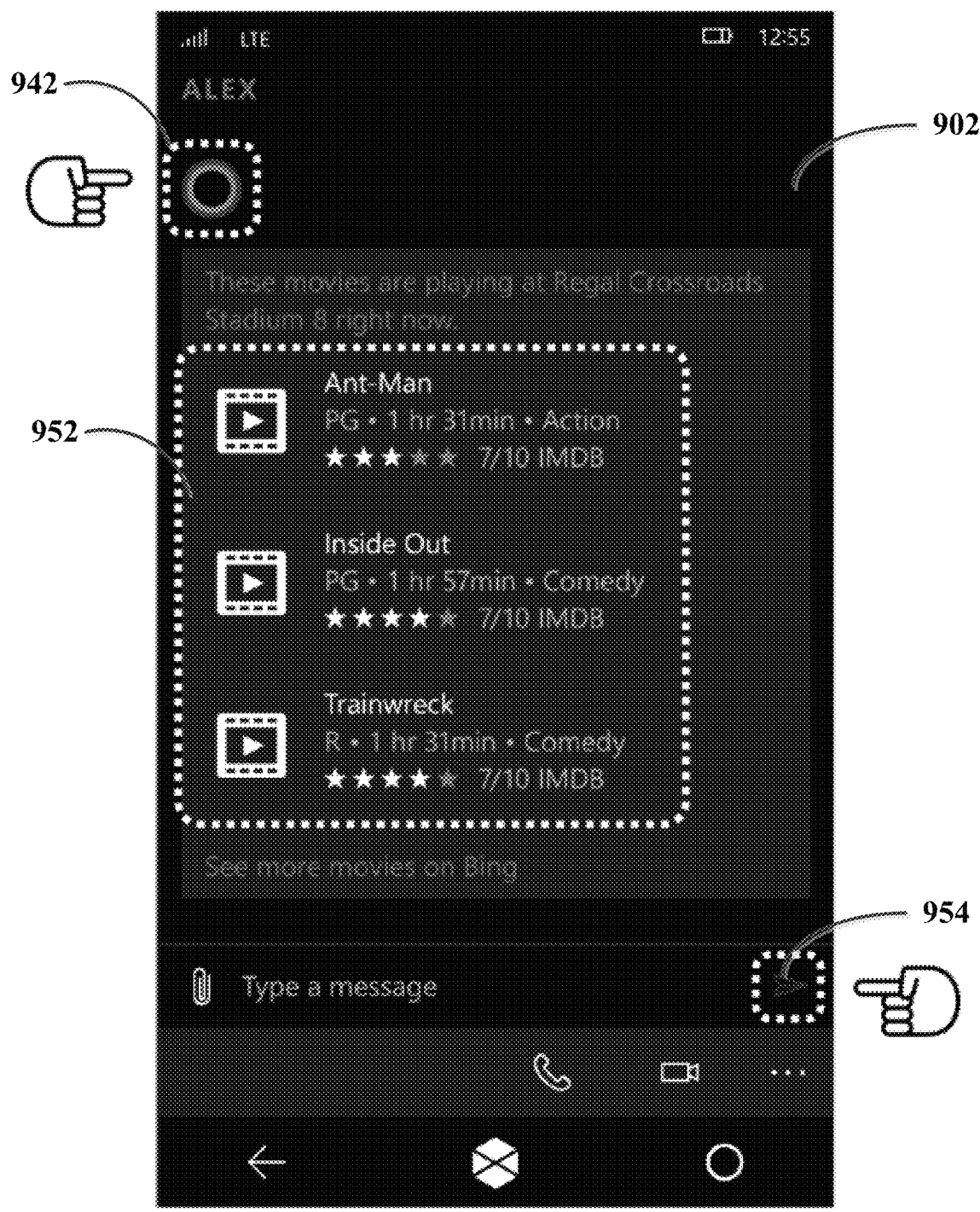

960

970

980

990

995

INTELLIGENT PERSONAL ASSISTANT AS A CONTACT

BACKGROUND

When a user is performing a task or communicating with another user via a messaging application or service, the user often needs to leave the application to get information or perform parallel tasks related to the task that is being attempted in the messaging application. Current solutions require users to manually obtain content from the other applications/services to include within another application such as a messaging application, among other examples. This may be done through copy and paste operations, transcribing content manually or performing a parallel task in another application such as an intelligent personal assistant application/service. An intelligent personal assistant is an application/service that can perform tasks or services for an individual. It is with respect to the general technical environment of utilizing an intelligent personal assistant to improve processing within an application that the present application is directed.

SUMMARY

Non-limiting examples of the present disclosure describe proactive action by an intelligent personal assistant application/service to improve functionality of one or more applications. One skilled in the art should recognize that a messaging application is used for description purposes and is just one example of an application that may incorporate functionality described herein. Examples herein may be applicable to any type of application and/or service.

An intelligent personal assistant application/service may analyze a thread (e.g. message thread) of an application (e.g. messaging application) in order to determine whether assistance can be provided by the intelligent personal assistant application/service. In one example, a messaging application may be executing on a processing device. The messaging application may comprise an intelligent personal assistant component that extends functionality of the messaging application to include services provided by an intelligent personal assistant application/service. The intelligent personal assistant component may analyze a message thread within the messaging application. Analysis of the message thread may occur proactively without requiring an explicit request for assistance from a user of the processing device. Analyzing of the message thread may comprise evaluating a context of message content within the message thread. In some examples, analysis of the message thread may further comprise evaluating signal data of a processing device and/or user associated with the message thread. In response to analyzing a message thread, the intelligent personal assistant component may proactively provide an indication that assistance is available from the intelligent personal assistant component. For instance, an indication may be provided that content, retrieved by the intelligent personal assistant component, is available to be included within the messaging application based on analysis of the message thread. In one example, a user may select the indication triggering the intelligent personal assistant component to proactively provide a cue within an application.

An intelligent personal assistant component may be configured to proactively provide a cue within the messaging application based on analysis of the message thread. As an example, a cue may comprise content retrieved by processing operations performed by the intelligent personal assistant component. An exemplary cue may include a contextual recommendation or suggestion in response to the message content. The cue may be presented in a rich format or plaintext format, among other examples. Natural language processing operations may be performed to present the cue as conversational content that a user may include within a messaging thread of the messaging application, among other examples. In one example, the cue may be provided as a message draft within the messaging application. This may enable a user of a processing device to take further action including but not limited to: evaluating whether a cue is relevant and choosing to include the cue within a message thread, modify the cue (e.g. append more information, manipulate content), dismiss the cue as not helpful or relevant, and further interact with the intelligent personal assistant component from within the messaging application, among other examples. Input may be received indicating to include the cue within a message thread. In one example, input indicating to include the cue within the message thread is a confirmation to transmit the message draft to the message thread. In response to receiving the input, the cue may be displayed within the message thread.

In another non-limiting example, an intelligent personal assistant service may interface with a messaging application to analyze a message thread within the messaging application. The intelligent personal assistant service may analyze the message thread by evaluating context of message content within the message thread. Analysis of the message thread may occur proactively without requiring an explicit request for assistance from a user of a processing device. In one example, before including a cue within a messaging application, the intelligent personal assistant service may proactively provide an indication that assistance is available from the intelligent personal assistant component. For instance, an indication may be provided that content, retrieved by the intelligent personal assistant component, is available to be included within the messaging application based on analysis of the message thread. In one example, a user may select the indication triggering the intelligent personal assistant component to proactively provide a cue within an application. In any example, in response to the analyzing of the message thread, the intelligent personal assistant service may proactively provide a cue that includes content retrieved by the intelligent personal assistant service. An input may be received to include the cue within the message thread. In response to receiving the input to include the cue within the message thread, the cue may be displayed within the message thread. An exemplary cue may include a contextual recommendation or suggestion in response to the message content. The cue may be presented in a rich format or plaintext format, among other examples. Natural language processing operations may be performed to present the cue as conversational content that a user may include within a messaging thread of the messaging application, among other examples. In one example, the cue may be provided as a message draft within the messaging application.

In yet another non-limiting example, an intelligent personal assistant service may be added as an active participant within a thread of an application. An exemplary application may be a messaging application, where the intelligent personal assistant service may be added as an active participant to the message thread, for example. A query directed to an intelligent personal assistant service may be entered into a message thread of a messaging application. A query may be entered using a processing device executing the messaging application. The query may comprise contact data that identifies the intelligent personal assistant service. An indication that the intelligent personal assistant service is added as an active participant within the message thread may be received, at a processing device, for example. In examples, an indication may comprise at least one selected from a group consisting of: adding the intelligent personal assistant as a listed participant in the message thread and providing, within the message thread, a notification that assistance is available from the intelligent personal assistant service. Content from the intelligent personal assistant service may be received directly into the message application. In one example, content may be received from the intelligent personal assistant service in response to providing selection of an indication that the intelligent personal assistant service is an active participant in the message thread. In another example, content may be received, within the messaging application, as a message draft that may be modified before inclusion within a message thread. An input may be provided indicating to include the received content within the message thread. In response to providing the input, content received from the intelligent personal assistant service may be displayed within the message thread.

In further examples, the intelligent personal assistant service may remain an active participant within the message thread after being added. In one instance, a message may be transmitted for inclusion within the message thread where the intelligent personal assistant service may proactively respond to the transmitted message. In another example, a message may be received, within the message thread, from another processing device. In response to receiving the message from the other processing device, a response from the intelligent personal assistant service may be received within the message thread. In at least one example, the intelligent personal assistance service is a distributed network service, for instance, where the intelligent personal assistant service may provide content from a distributed resource (e.g., cloud resource) to be incorporated into an application executing on one or more processing devices.

In another non-limiting example, a query directed to an intelligent personal assistant service may be received. The query may be received within an active thread of an application, for example, where the active thread may be a message thread within a messaging application. The query may comprise contact data that identifies the intelligent personal assistant service. The contact data may be used to involve the intelligent personal assistant service as the active participant within a message thread. In response to receiving the query, the intelligent personal assistant service may be added as an active participant within the message thread. Message content within the message thread may be analyzed. An indication that content is available from the intelligent personal assistance service may be provided within the message thread. The received content may be displayed within the message thread. In one example, a selection of the indication is received, which may trigger display of the content within the message thread. In further examples, the intelligent personal assistant service may remain an active participant within the message thread after being added. For instance, additional message content within the message thread may be identified triggering re-analysis of the message thread. The intelligent personal assistant service may proactively provide, within the message thread, a response to the additional message content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 is a block diagram illustrating an example of a computing device with which aspects of the present disclosure may be practiced.

FIGS. 2A and 2B are simplified block diagrams of a mobile computing device with which aspects of the present disclosure may be practiced.

FIG. 7 is an exemplary method for interaction of an exemplary intelligent personal assistant service which aspects of the present disclosure may be practiced.

FIGS. 9A-9J are exemplary processing device views illustrating an exemplary intelligent personal assistant as an active participant in an application with which aspects of the present disclosure may be practiced.

DETAILED DESCRIPTION

Figure 2B:
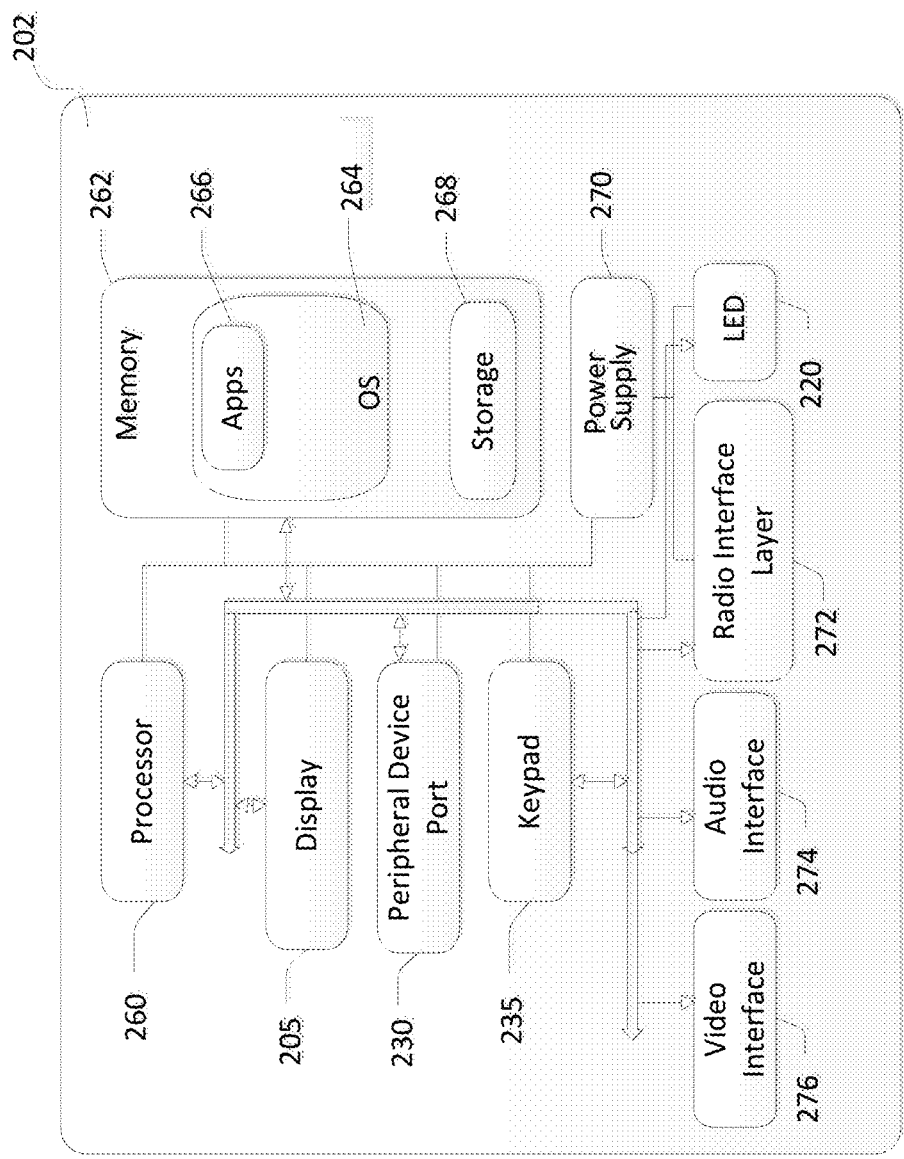

Non-limiting examples of the present disclosure describe extensibility of applications using an intelligent personal assistant. An intelligent personal assistant is an application/service that can perform tasks or services for an individual. Examples described herein may reference an intelligent personal assistant service or an intelligent personal assistant component that is a processing component configured to execute an intelligent personal assistant application/service. One example of an intelligent personal assistant is MICROSOFT CORTANA. An intelligent personal assistant may operate while respecting user privacy laws. If a user consents to having application content analyzed by an intelligent personal assistant, content may be actively analyzed to improve application processing. In one example, an intelligent personal assistant may analyze application content and provide assistance to one or more user processing devices by providing an indication that assistance is available from the intelligent personal assistant. In one example, if an intelligent personal assistant determines that it can provide assistance based on the analysis of a thread within an application, a user interface (UI) indication may be presented on a user processing device where the UI indication identifies that assistance is available from an intelligent personal assistant. Examples of UI indications are illustrated and described in the description of FIGS. 8A-8F and 9A-9J, among other examples.

If the user engages the active UI indication through input into a processing device, a processing device is presented with proactive content such as a cue. In alternative examples, a cue may be provided within an application without requiring a UI indication. As an example, a cue may comprise content retrieved by processing operations performed by an intelligent personal assistant service. An exemplary cue may include a contextual recommendation or suggestion in response to the message content. The cue may be presented in a rich format or plaintext format, among other examples. Natural language processing operations may be performed to present the cue as conversational content that a user may include within a messaging thread of a messaging application, among other examples. As identified above, a messaging application is just one example of an application that may interface with an intelligent personal assistant. Other example applications include but are not limited to: email applications, conversational applications, collaborative applications, productivity applications, and web browsing applications, among other examples. In one example, the cue may be provided as a message draft within the messaging application, which a user may include within a message thread. A message thread is a grouping of message content. A messaging application may comprise a plurality of message threads. An intelligent personal assistant may be configured to identify a current message thread and proactively analyze a current message thread and provide exemplary cues to one or more processing devices associated with the current message thread. Analysis of a message thread as well as providing of an exemplary cue may occur proactively without requiring explicit request for assistance from a user processing device.

In other examples, an intelligent personal assistant may be a contact that can be added to a thread of an application such as a message thread of a messaging application. In one example, a user processing device may make an explicit query directed to an intelligent personal assistant service. Processing of the query may result in the intelligent personal assistant service being added as an active participant within a thread of an application. As an active participant within a thread, an intelligent personal assistant may be configured to proactively provide questions, responses, content, etc. As an active participant in a message thread, an intelligent personal assistant may communicate with one or more parties of the message thread as well as cross-reference interests of the parties by evaluating context of the message thread, signal data retrieved from processing devices, and user account data of users involved in the message thread, among other examples. Operation of an intelligent personal assistant, including as an active participant in a thread, occurs while respective privacy rights of users/processing devices. In examples, an intelligent personal assistance service is a distributed network service, for instance, where the intelligent personal assistant service may provide content from a distributed resource (e.g., cloud resource) to be incorporated into an application executing on one or more processing devices. In another example, the intelligent personal assistant service may be an application executing locally on a processing device that is configured to provide network access (e.g. through the Internet).

Accordingly, the present disclosure provides a plurality of technical advantages including but not limited to: extensibility of applications to include functionality of intelligent personal assistant application/service, proactively analyzing context of applications, proactively providing contextual recommendations/suggestions, ability to add an intelligent personal assistant service as an active participant in an application thread, ability to improve user interaction with processing device during execution of an application including providing of UI indications to user processing devices, more efficient operation of a processing device (e.g., saving computing cycles/computing resources) that does not require a user processing device to execute a plurality of applications to identify content and include the content within a single application, reduction in latency for content transfer between processing devices/applications, and scalability to incorporate an intelligent personal assistant service within any application in a platform-agnostic manner, among other examples.

Figure 3:
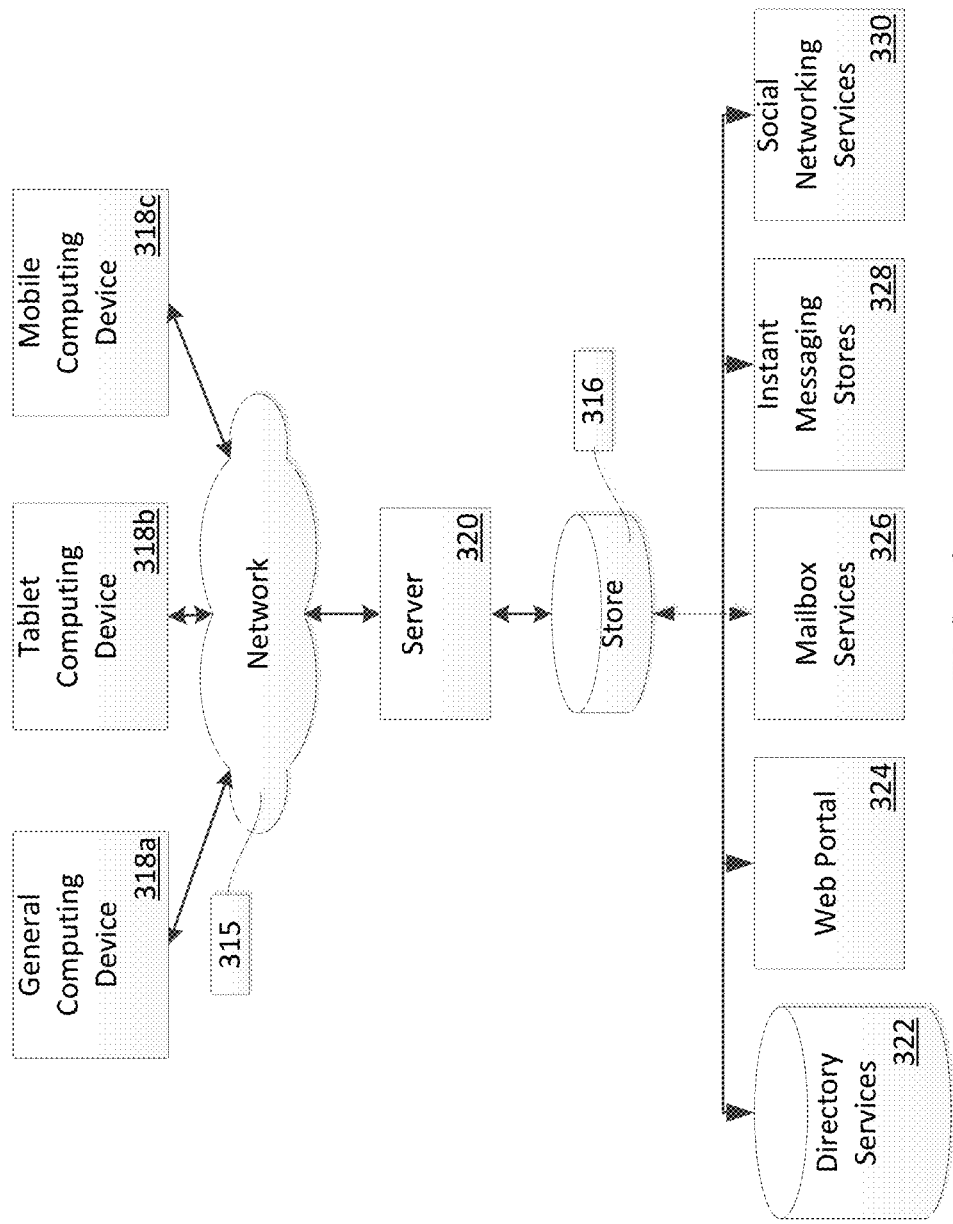
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed related to incorporating an intelligent personal assistant service within an application as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing related to incorporating an intelligent personal assistant service within an application as described herein. For example, mobile computing device 200 may be implemented to execute applications and/or application command control related to incorporating an intelligent personal assistant service within an application. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system for processing related to incorporating an intelligent personal assistant service within an application as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, 10 manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
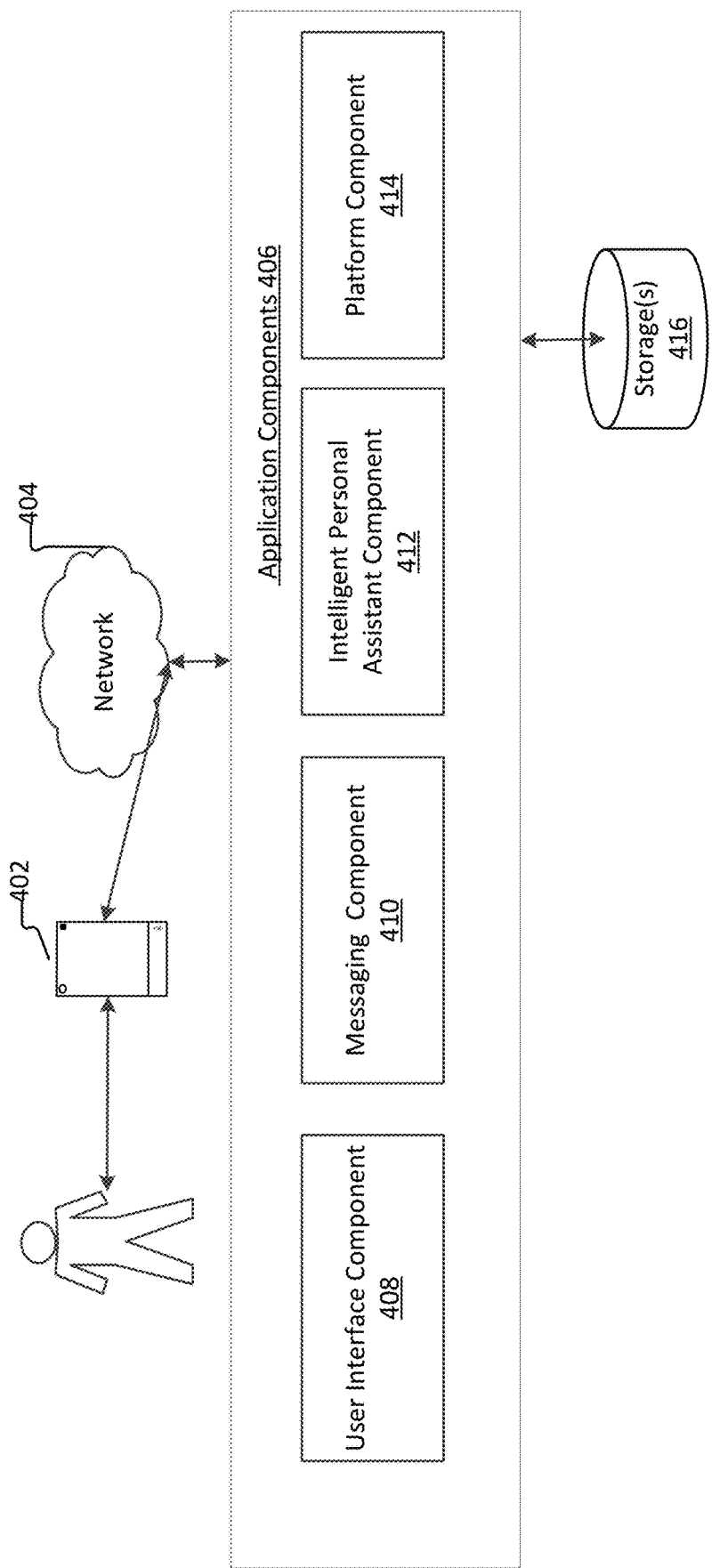
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing related to incorporating an intelligent personal assistant service within an application as described herein. Exemplary system 400 presented is a combination of interdependent components that interact to form an integrated whole for incorporation of an intelligent personal assistant within one or more applications. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Furthermore, it is presented that application service components of system 400 may interface with other application services. Application services may be any resource that may extend functionality of one or more components of system 400. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Further, components of system 400 may possess processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces etc.), vehicular processing devices, and any other devices having at least one processor, among other examples. Exemplary system 400 comprises application components 406 including a user interface component 408, a messaging component 410, an intelligent personal assistant component 412 and a platform component 414, where each of the identified components may comprise one or more additional components.

System 400 may further comprise one or more storages 416 that may store data associated with operation of one or more components of system 400. In examples, storages 416 may interface with other components of system 400. Data associated with any component of system 400 may be stored in storages 416, where components may be connected to storages 416 over a distributed network including cloud computing platforms and infrastructure services. Exemplary storages 416 may be any of a first-party source, a second-party source, and a third-party source. Storages 416 are any physical or virtual memory space. Storages 416 may store any data for processing operations performed by components of system 400, retained data from processing operations, stored programs, code or application programming interfaces (APIs), training data, links to resources internal and external to system 400 and knowledge data among other examples. Furthermore, in examples, components of system 400 may utilize knowledge data in processing by components of system 400. Knowledge may be used by one or more components of system 400 to improve processing of any of the application components 406 where knowledge data can be obtained from resources internal or external to system 400. In examples, knowledge data may be maintained in storage(s) 416 or retrieved from one or more resources external to system 400 by knowledge fetch operation. As an example, storages 416 may store user interface data/GUI data, application data, data associated with an intelligent personal assistant service, knowledge data, user data, and processing device data, among other examples.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing applications/services. In examples, processing device 402 may communicate with the application components 406 via a network 404. In one aspect, network 404 is a distributed computing network, such as the Internet. Application services may communicate with application components 406 via the network 404. Processing device 402 may be a device as described in the description of FIGS. 1-3. In some examples, processing device 402 may comprise multiple connected devices.

The application components 406 are a collection of components configured to manage interactions of an intelligent personal assistant service with one or more applications. Application components 406 may comprise a user interface component 408, a messaging component 410, an intelligent personal assistant component 412 and a platform component 414. In alternative examples, one or more additional components may be created to manage operations described throughout the present disclosure. In different examples, the application components 406 may be used to execute independently from other application components 406. As an example, processing executed by any of the application components 406 may be performed by a processing device or incorporated into a product separately from processing performed by other components such as the user interface component 408 or the intelligent personal assistant component 412. Application components 406 may be stored on one or more processing devices (e.g., client device) or access to one or more of the application components 406 may be distributed, for example through a distributed network.

The user interface component 408 is one or more components that are configured to enable interaction with a user of a processing device. Transparency and organization are brought to users of a processing device through the user interface component 408 where an intelligent personal assistant service can interact with a user processing device through the user interface component 408. As an example, the user interface component 408 may comprise generation and display of one or more user interface elements that may be displayed upon a processing device during execution of one or more applications. The user interface elements may be graphical icons used to represent information associated with an application. The user interface component 408 may further execute as a front-end for display (e.g., graphical user interface) of back-end processing performed by the other application components 406. In examples, user interface definition files may be used to define user interface elements for fostering interaction between a processing device and applications/services that may be associated with an intelligent personal assistant. User interface definition files may comprise programming instructions or operations for management and display of user interface elements associated with user interface component 408. As an example, user interface elements may be used to illustrate operations including but not limited to: application management, entering data into message thread, providing UI indication from an intelligent personal assistant service, providing cues from an intelligent personal assistant service, providing of message content by an intelligent personal assistant service, etc. Examples of UI indications provided by an intelligent personal assistance service may include but are not limited to: illumination of a processing device, visual presentations (e.g., image, GIF, avatar, etc.), audio alerts (accompanying a message on a processing device), vibrations (accompanying a message on a processing device), and in-application messaging/notifications/icons, among other examples.

The messaging component 410 is a component configured to execute an application that interfaces with an intelligent personal assistant (e.g., through the intelligent personal assistant component 412). In one example, the messaging component 410 is configured to execute a messaging application that comprises one or more message threads. As identified above, an intelligent personal assistant service may be configured to interface with any type of application, where a messaging application is just one example of an application. The messaging component 410 may interface the intelligent personal assistant component 412 to enable an application to incorporate functionality of an intelligent personal assistant service. An intelligent personal assistant service may interface with the messaging component 410 through one or more computer-executable programs, application programming interfaces (APIs), add-ons, functions, etc. Software developers may configure an application such as a messaging application to communicate with an intelligent personal assistance service to analyze a thread of the messaging application. In other examples, an intelligent personal assistant service may operate separately from an application. The intelligent personal assistant service may detect one or more executing applications and threads within executing the applications. The messaging component 412 further interfaces with other application components 406 such as the user interface component 408 to enable display of a messaging application as well as receive and process input from one or more processing devices and/or an intelligent personal assistant service.

The intelligent personal assistant component 412 is a component that manages an intelligent personal assistant application/service. The intelligent personal assistant component 412 may be configured to make processing devices (and users) aware of application monitoring executed by the intelligent personal assistant service as well as receive user consent for such monitoring and interaction with a user processing device. In some examples, the intelligent personal assistant component 412 may be configured to provide progressive disclosure of a privacy policy protecting users. For instance, notice may be provided that an intelligent personal assistant service is being used to evaluate message content. Some queries may be able to be resolved without collecting any personal information or signal data, where limited functionality (that does not rely on personal information or signal data of a processing device) of an intelligent personal assistant service is provided from the start. If personal information or signal data is to be collected and used for returning better processing results, users may be made aware of collection of such data. A common example is the collection of processing device location data. A UI element may be presented to the user asking them to acknowledge that a user agrees to transmit location data for an application/service to utilize.

As identified above, the intelligent personal assistant service may interface with the messaging component 410 through one or more computer-executable programs, application programming interfaces (APIs), add-ons, functions, etc. For instance, the intelligent personal assistant component 412 may proactively analyze one or more message threads of a messaging application to proactively provide exemplary cues. In doing so, the intelligent personal assistant component 412 may be configured to execute processing operations that evaluate context of message content within the messaging application. Input recognition processing and identification is known to one skilled in the art. The intelligent personal assistant component 412 may further execute processing operations that identify and extract active entity data from message content. In one example, a message may be received that reads, "Let's find a restaurant in Seattle." Contextual evaluation of such message content may identify that Seattle refers to a city in the state of Washington, where user intent is to identify a restaurant in Seattle. Identifying such information enables the intelligent personal assistant service to run more specific queries and return better results for a user.

The intelligent personal assistant component 410 may be further configured to take into account additional data to improve query processing. For instance, an intelligent personal assistant service (executed by the intelligent personal assistant component 410) may collect and analyze signal data associated with a message thread. Signal data may comprise any type of data that can be collected from users of an application, processing devices associated with an application, user account data (e.g., platform accounts for users that may be signed in during execution of a message thread), etc. Exemplary signal data that may be collected and evaluated may comprise but is not limited to:

User Data: Any data identifying a user that initiated an input.

Language Data: Data indicating languages associated with a user such as language of OS, applications etc. or preferred language for retrieval of a results data, among other examples.

Location Data: Data that may be used to identify any location data from an input/query including location data where an input is transmitted as well as location data associated with entity data extracted from application content (such as message content within a message thread).

Form Factor Data: Data that identifies a device type associated with an input or application or system. As an example, such data may be important because intent of an input may be very different based on the device upon which a query is initiated (e.g., desktop versus mobile); alternatively, a user intent/desire to obtain result data in a particular form/format (e.g., mobile version of an application/service).

Entry Point Data: Data that indicates a system/application/service that issued the input/query. For instance, entry point data is signal data that identifies whether a query is initiated from a messaging application, search application, an intelligent personal assistant, a word processing application, a calendar application, etc.

Application Execution Data: Data indicating applications that are executing on a processing device/system. Can include data indicating detection of one or more foreground applications as well as other applications that may be executing/running on the processing device/system.

Time Data: Data that provides temporal dimensions associated with a received input/query. For instance, timestamp data may be used to evaluate relevance of result data to intent of a received input.

Personalization/Context data: Data such as location and/or language preference settings of the user of a device or application (e.g., browser, search engine, etc.). Also may consider context data of user with respect to previous queries of the user, other threads, users involved in threads, other executing applications/services, domain types, preferences, etc.

The intelligent personal assistant component 412 may further be configured to manage presentation and display of exemplary cues within a messaging application. As an example, the intelligent personal assistant component 412 may execute processing operations to detect a type of application that a processing device is executing including whether the processing device has a network connection. This may assist the intelligent personal assistant component 412 in determining whether to provide an exemplary cue in a rich format or a plaintext format. Furthermore, generation of an exemplary cue may account for form factor of a processing device. When generating a rich format cue, the intelligent personal assistant component 412 may be configured to incorporate any of: column-based formatting, inline content inclusion, and interactive content such as links, commands, related content and/or applications, recommendations, etc. As an example, the intelligent personal assistant component 412 may interface with the platform component 414 to provide extensibility beyond that of a single application. That is, an intelligent personal assistant service may utilize a plurality of different applications across a platform (e.g., distributed network service) to improve content retrieval to enhance an application experience for a user. Moreover, natural language processing operations may be applied to responses transmitted by the intelligent personal assistant component 412. This enables an intelligent personal assistant service to provide responses (e.g. reply, message, cue, content) in a conversational manner.

In other examples, the intelligent personal assistant component 412 may be configured to manage an intelligent personal assistant service as a contact, where the intelligent personal assistant component may be added as an active participant in a message thread, for example. For instance, the intelligent personal assistant component 412 is configured to detect when a query in an application is directed to an intelligent personal assistant service. In one example, a query may include reference to an intelligent personal assistant service such as "CORTANA, can you find me Sushi restaurants in Seattle?" However, in other cases, evaluation of a context of message content may more subtly trigger inclusion of an intelligent personal assistant service within a message thread. For instance, an intelligent personal assistant service may detect (through contextual evaluation of application content such as message content) that users are trying to figure out where something is located or a place to meet up. The intelligent personal assistant component 412 may be configured to proactively provide indication that an intelligent personal assistant service may be added as a participant within a message thread, conversation, etc.

The platform component 414 is a component used to manage interaction with a plurality of additional applications/services to provide extensibility for an application. The platform component 414 may be utilized to connect the intelligent personal assistant service to resources stored locally on a processing device and/or over a distributed network. In one example, the intelligent personal assistant service may connect with a cloud computing platform and infrastructure to provide extensibility for the intelligent personal assistant service to retrieve content to include within a result, cue, message, etc. The platform component 414 may connect the intelligent personal assistant service with any of first-party services, second-party services, and third-party services.

Figure 5:
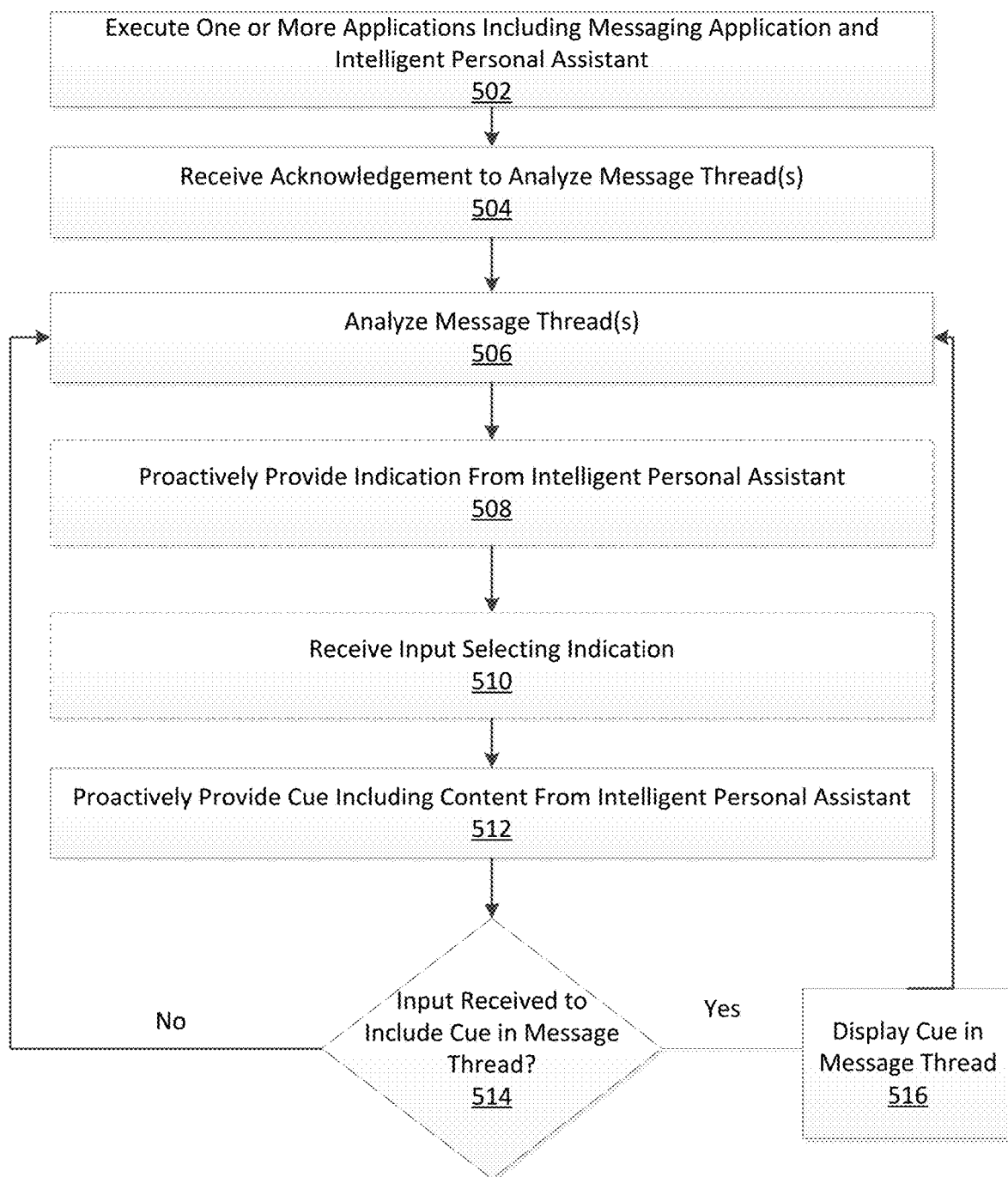
FIG. 5 is an exemplary method for interaction of an exemplary intelligent personal assistant with which aspects of the present disclosure may be practiced.

FIG. 5 is an exemplary method 500 illustrating interaction of an exemplary intelligent personal assistant with which aspects of the present disclosure may be practiced. As an example, method 500 may be executed by an exemplary processing device and/or system such as those shown in FIGS. 1-4. In one example, system 400 of FIG. 4 describes examples of components that may be used for implementation of method 500. In examples, method 500 may execute on a device comprising at least one processor configured to store and execute operations, programs or instructions. For instance, method 500 may be processing operations executed by a client device such as processing device 402 described in FIG. 4. However, method 500 is not limited to such examples. In at least one example, method 500 may be executed (e.g., computer-implemented operations) by one or more components of a distributed network, for instance, web service/distributed network service (e.g., cloud service). Operations performed in method 500 may correspond to operations executed by a system and/or service that execute computer programs, application programming interfaces (APIs), or machine-learning processing, among other examples.

Method 500 begins at operation 502 where one or more applications are executed. As an example, an application may be executed on a processing device. In an alternative example, one or more applications may be executing as a service across a distributed network. Operation 502 may comprise executing a messaging application. In one example, the messaging application may comprise an intelligent personal assistant component. An intelligent personal assistant component may be an application component that interfaces an intelligent personal assistant service within the messaging application. An example of an intelligent personal assistant component is intelligent personal assistant component 412 as described in the description of FIG. 4. In an alternative example, an intelligent personal assistant application/service may be executed separately from the messaging application.

Flow may proceed to operation 504, where acknowledge is received from a processing device and/or user to analyze a message thread of the messaging application. An intelligent personal assistant component may be configured to make a user aware that the intelligent personal assistant service is analyzing content of an application. In at least one example, an intelligent personal assistant component may provide notification to a user processing device one or more times. In alternative examples, operation 504 may comprise managing settings/options related to operation of a processing device and/or services upon the processing device. In another example, receipt (operation 504) of acknowledgement may be a processing device signal indicating that a user has not limited functionality of an intelligent personal assistant component on a processing device.3

Flow may proceed to operation 506, where a message thread is analyzed. Operation 506 may comprise evaluating context of message content within a message thread. Analysis of the message thread may occur proactively without requiring an explicit request for assistance from a user of a processing device. Operation 506 may comprise executing processing operations that identify and extract active entity data from message content. Analysis of a message thread may further comprise collecting and analyze signal data associated with a message thread. Signal data may comprise any type of data that can be collected from users of an application, processing devices associated with an application, user account data (e.g., platform accounts for users that may be signed in during execution of a message thread), etc. Examples of signal data have been described previously, for example, in the description of FIG. 4. In one example, analysis (operation 506) of a message thread may comprise evaluating signal data from a processing device, extracting entity data from the message content and utilizing the extracted entity data, the signal data and context from the message content to generate an exemplary cue.

In some examples, flow may proceed to operation 508, where an indication is proactively provided from an intelligent personal assistant component. An indication may be provided (operation 508) to indicate that assistance is available from the intelligent personal assistant component. As an example, the indication may indicate that content is available to be included within the messaging application. Examples of UI indications provided by an intelligent personal assistance service may include but are not limited to: illumination of a processing device, visual presentations (e.g., image, GIF, avatar, etc.), audio alerts (accompanying a message on a processing device), vibrations (accompanying a message on a processing device), and in-application messaging/notifications/icons, among other examples. In one example, the indication may be provided (operation 508) within the messaging application by an intelligent personal assistant component. For instance, an indication may be a graphical UI element presented within the messaging application. In another example, an indication may be provided (operation 508) on a processing device outside of the messaging application. For instance, an indication may be an illumination of a button on a processing device or a vibration of a processing device (accompanying a message alert on a processing device), among other examples. In examples where an indication is provided, flow may proceed to operation 510, where input is received that selects the indication (or a message associated with the indication).

In response to receiving input selecting the indication, a cue may be proactively provided (operation 512) by the intelligent personal assistant component. A cue is considered to be proactively provided as a user/processing device is not required to make an explicit invocation requesting assistance from an intelligent personal assistant component. Examples of a cue have been described previously in the foregoing including in the description of FIG. 4. An exemplary cue may comprise content retrieved from the intelligent personal assistant component based on analysis of the message thread. For instance, a cue may be a contextual recommendation or suggestion determined from the message content. An exemplary cue may be presented in a rich format or a plaintext format. Presentation of the cue may depend on the type of application, the type of processing device or the user (user account associated with a processing device), among other examples. In examples, a cue may be a natural language processing result generated by the intelligent personal assistant component. As an example, a response provided (operation 512) by the intelligent personal assistant component may be run through natural language processing to provide content retrieved in a conversational manner when it is presented within a message thread. In one example, a cue is provided as a message draft within the message application.

Flow may proceed to decision operation 512, where it is determined whether input is received to include the cue within a message thread. In some instances, a user may elect to not include the cue within the message thread. In such a case, flow branches NO and may return to operation 506, where the intelligent personal assistant component may continue to analyze the message thread. In alternative examples (not shown), the intelligent personal assistant component may continue a dialog with a user processing device to return alternative or updated results data based on a follow-up response from a user.

In other cases, input may be entered signaling to include the cue within the message thread. In one example, input may be selected that indicates to send a message draft (including the cue) to a message thread. In some examples, a user may modify a cue before including providing input to include the cue within a message thread. For instance, a user may elect to add message content to provide context for the cue. If input is received to include the cue within a message thread, flow branches YES and proceeds to operation 514, where the cue is displayed within a message thread. In at least one example, display (operation 514) of the cue within a message thread comprises an indication that the content is retrieved by the intelligent personal assistant component. Flow may return to operation 506, where the intelligent personal assistant component may continue to analyze the message thread.

Figure 6:
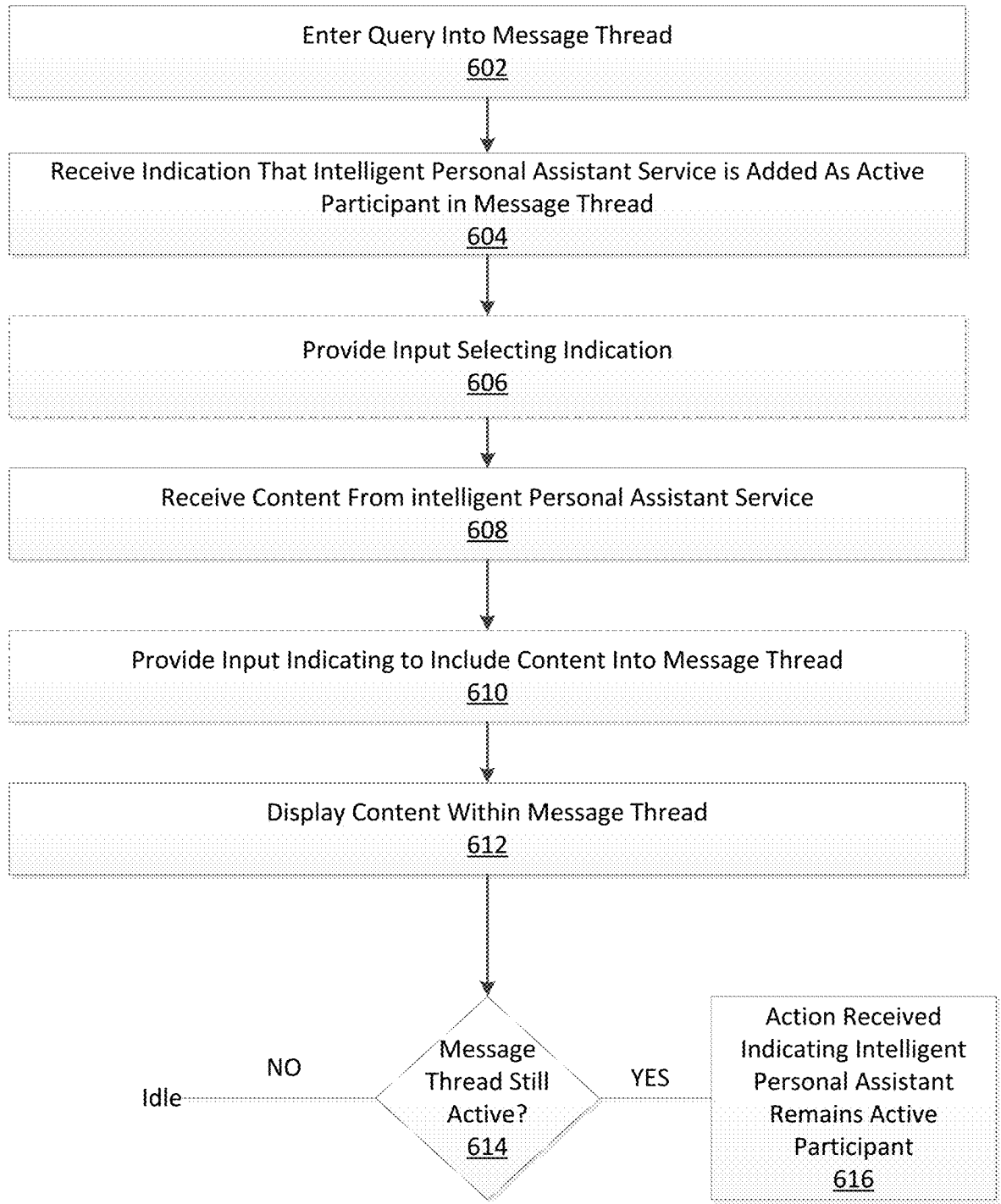
FIG. 6 is an exemplary method for operations within an application executing upon a processing device with which aspects of the present disclosure may be practiced.
Figure 8A:
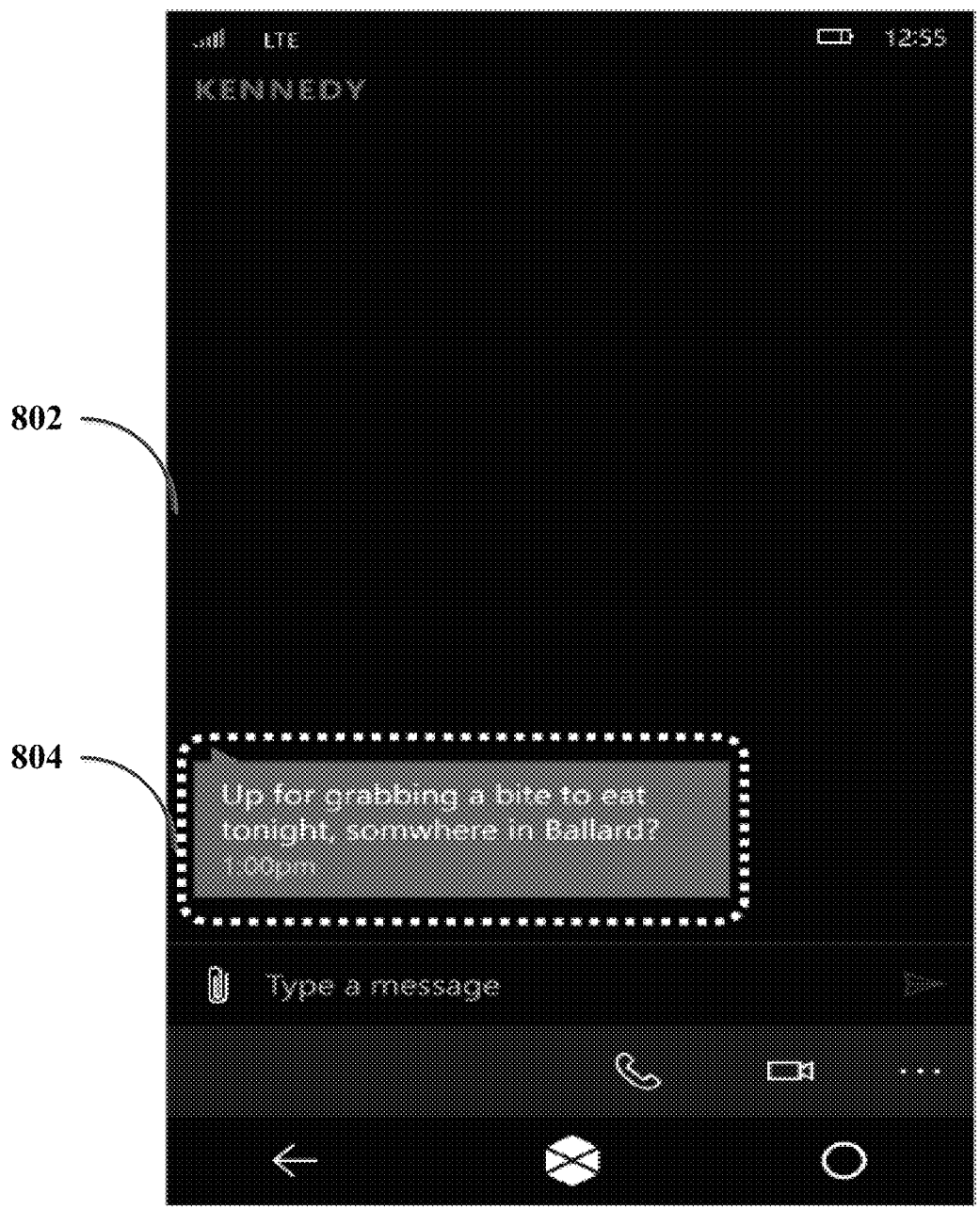
FIGS. 8A-8F are exemplary processing device views illustrating execution of a messaging application with which aspects of the present disclosure may be practiced.
Figure 8B:
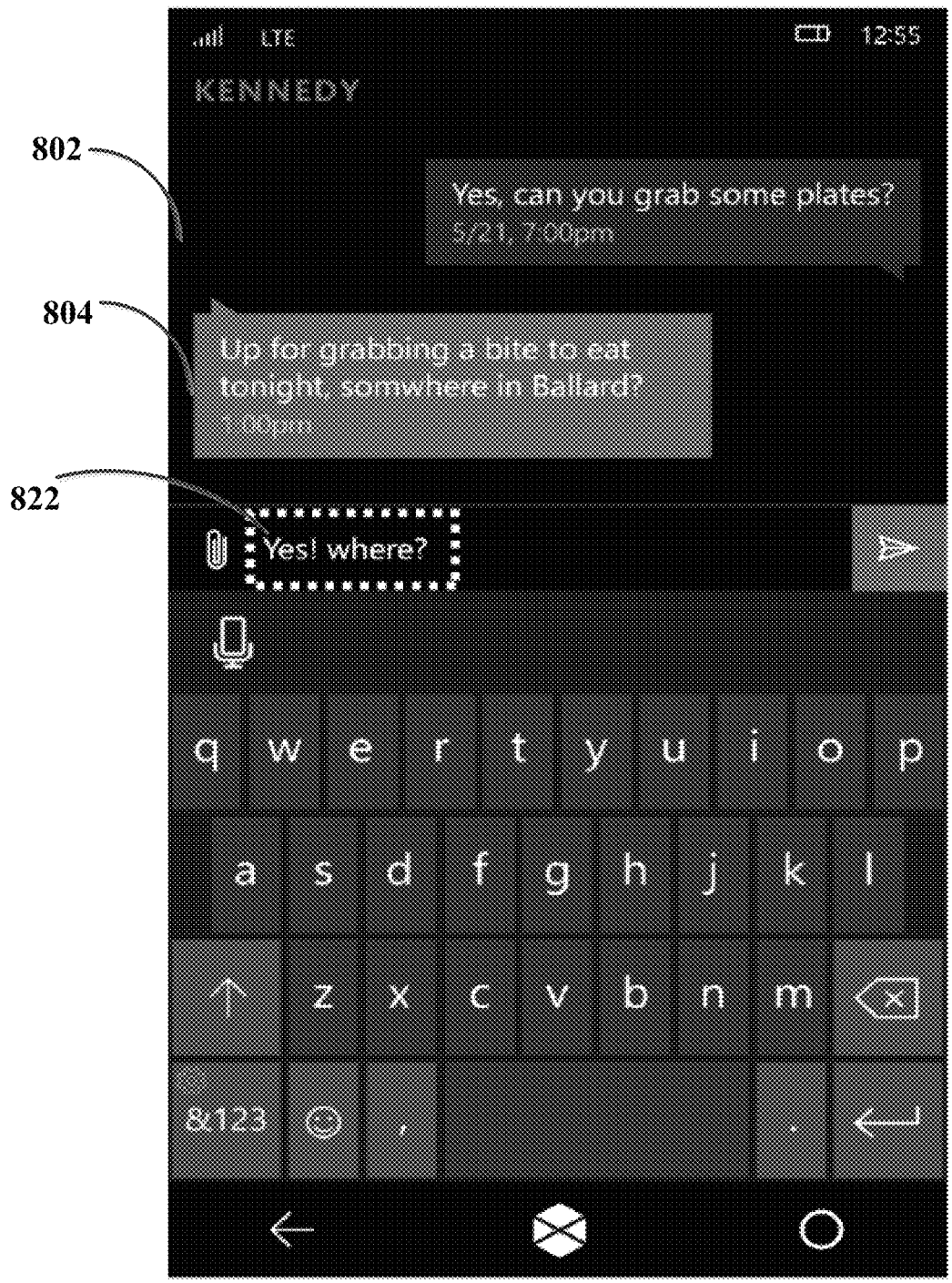
Figure 8C:
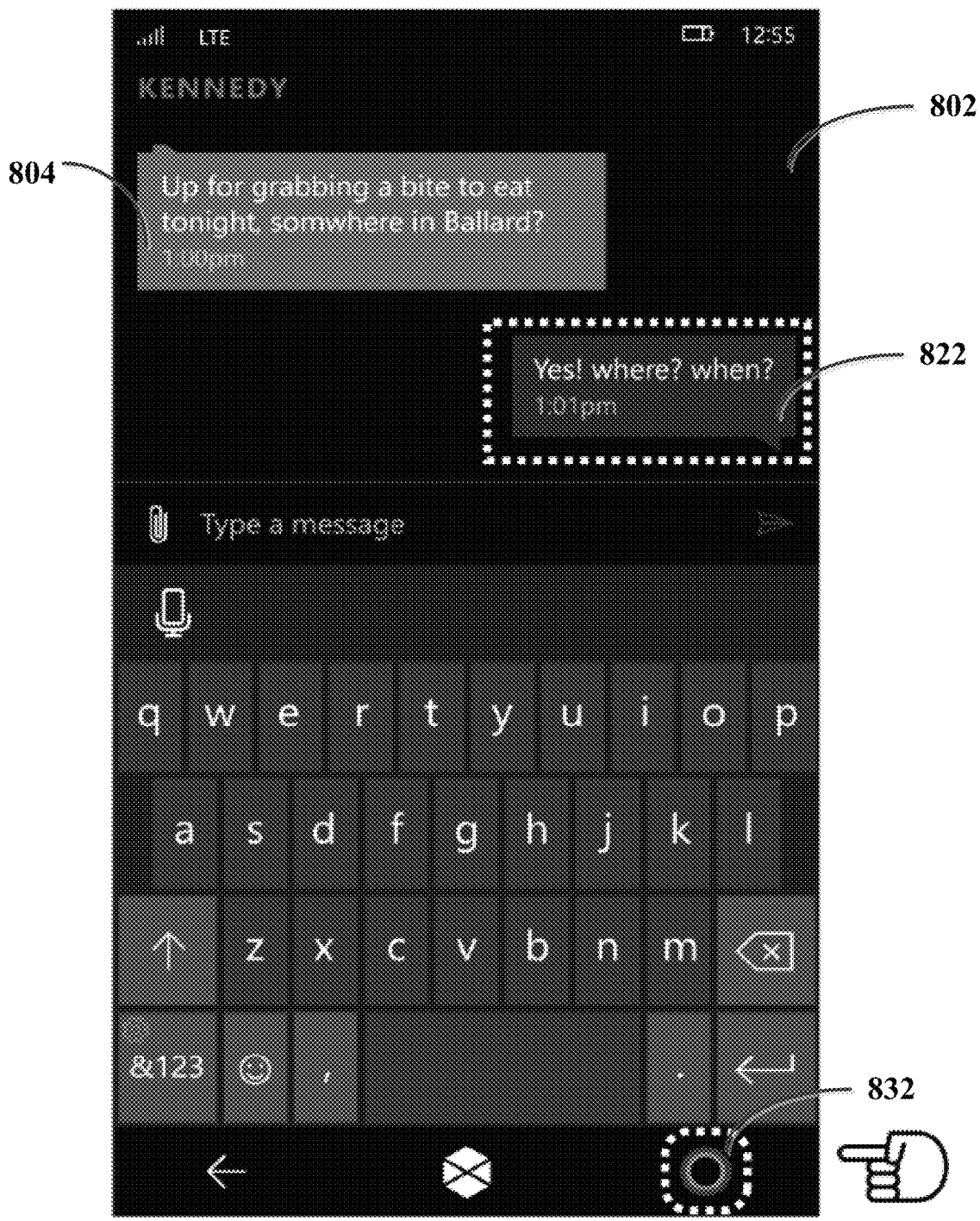
Figure 8D:
Figure 8E:
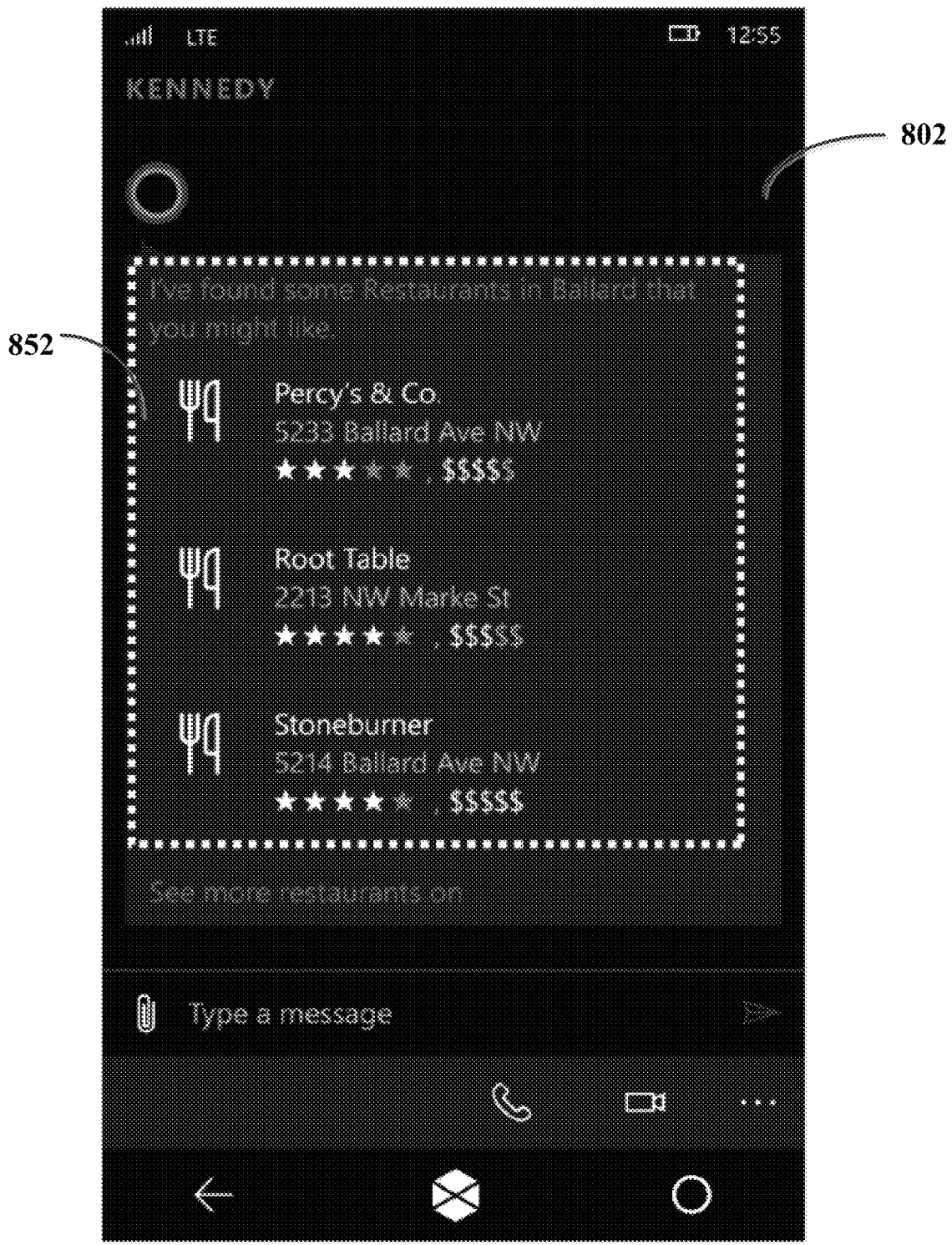
Figure 8F:
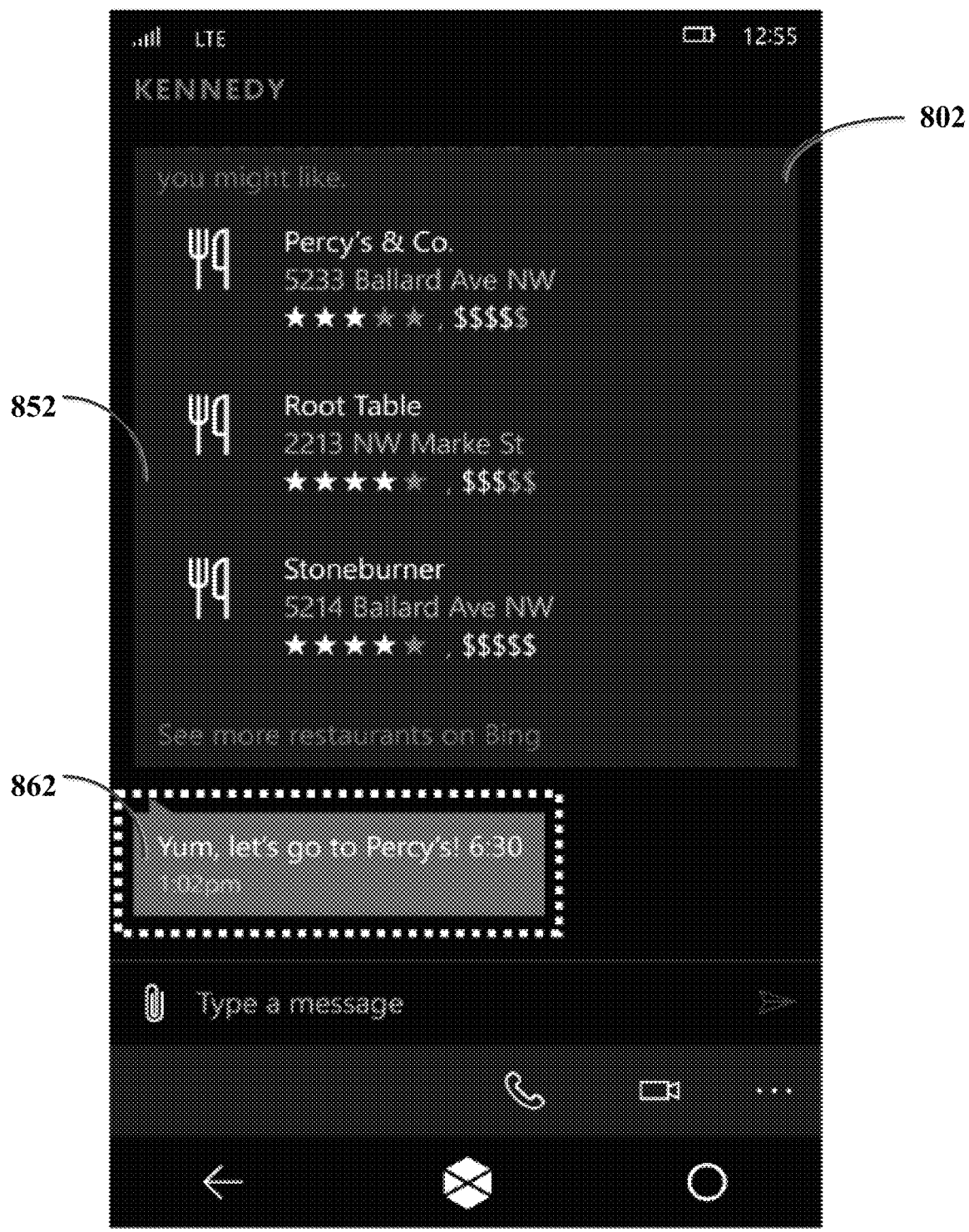
Figure 9A:
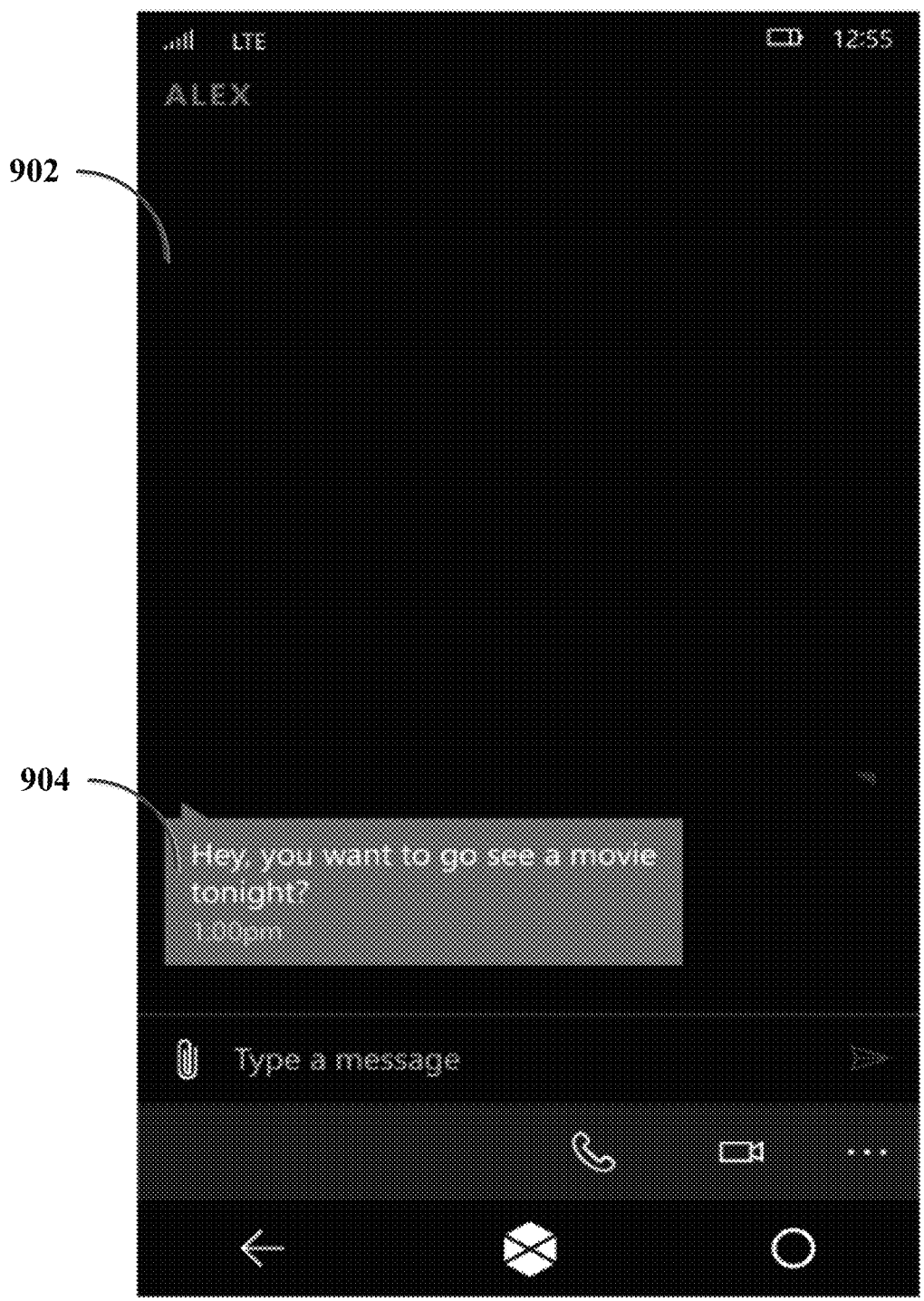
Figure 9B:
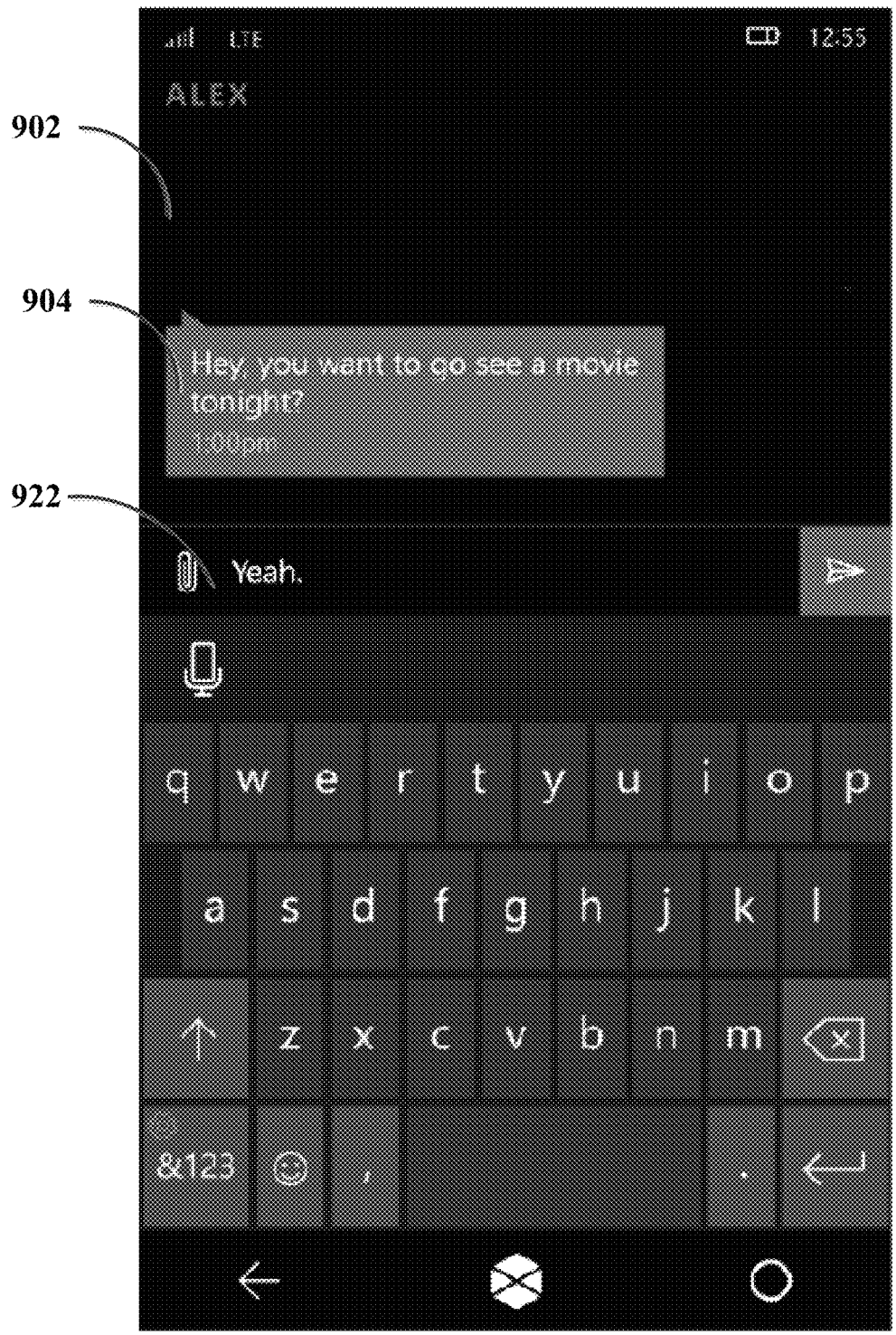
Figure 9C:
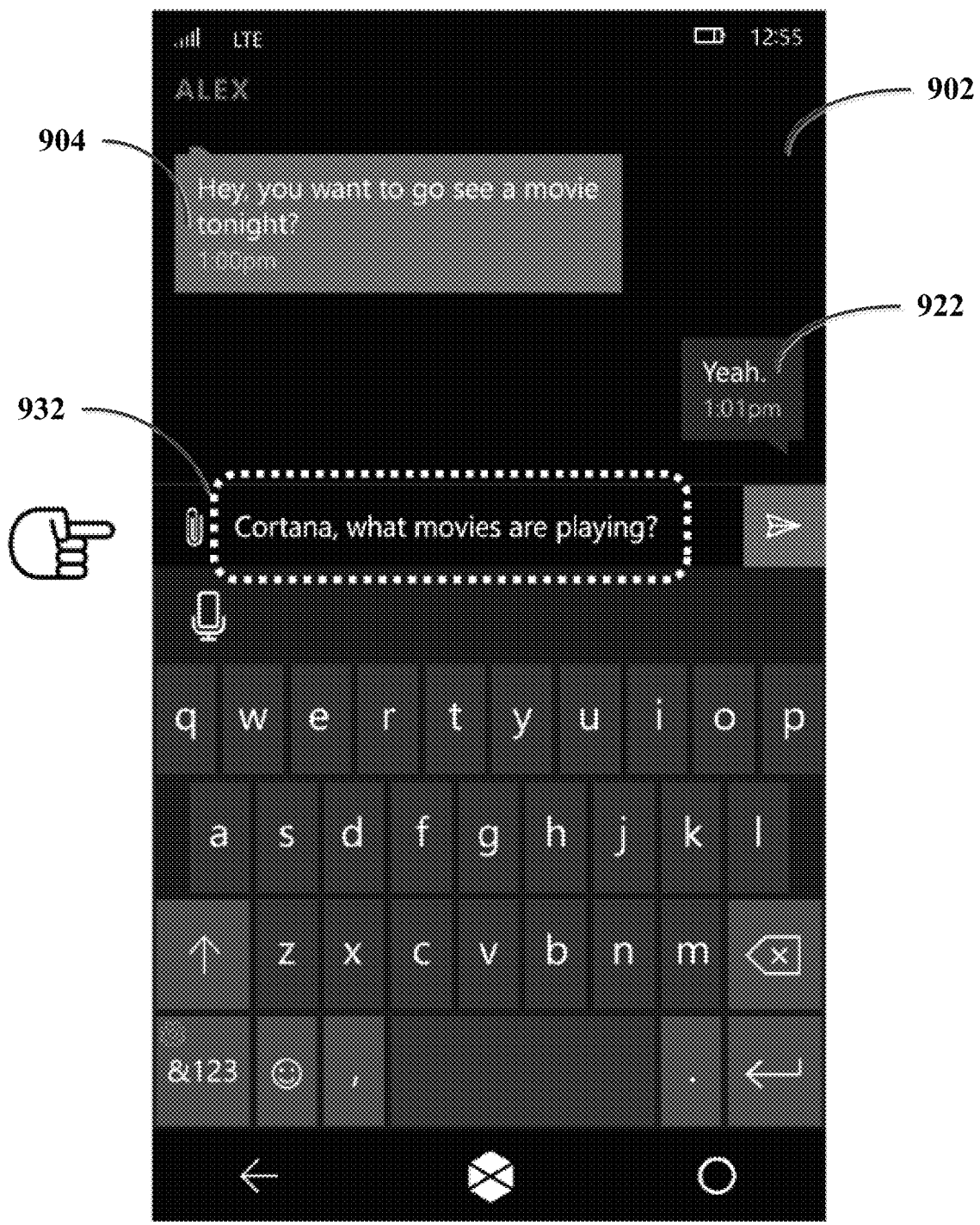
Figure 9F:
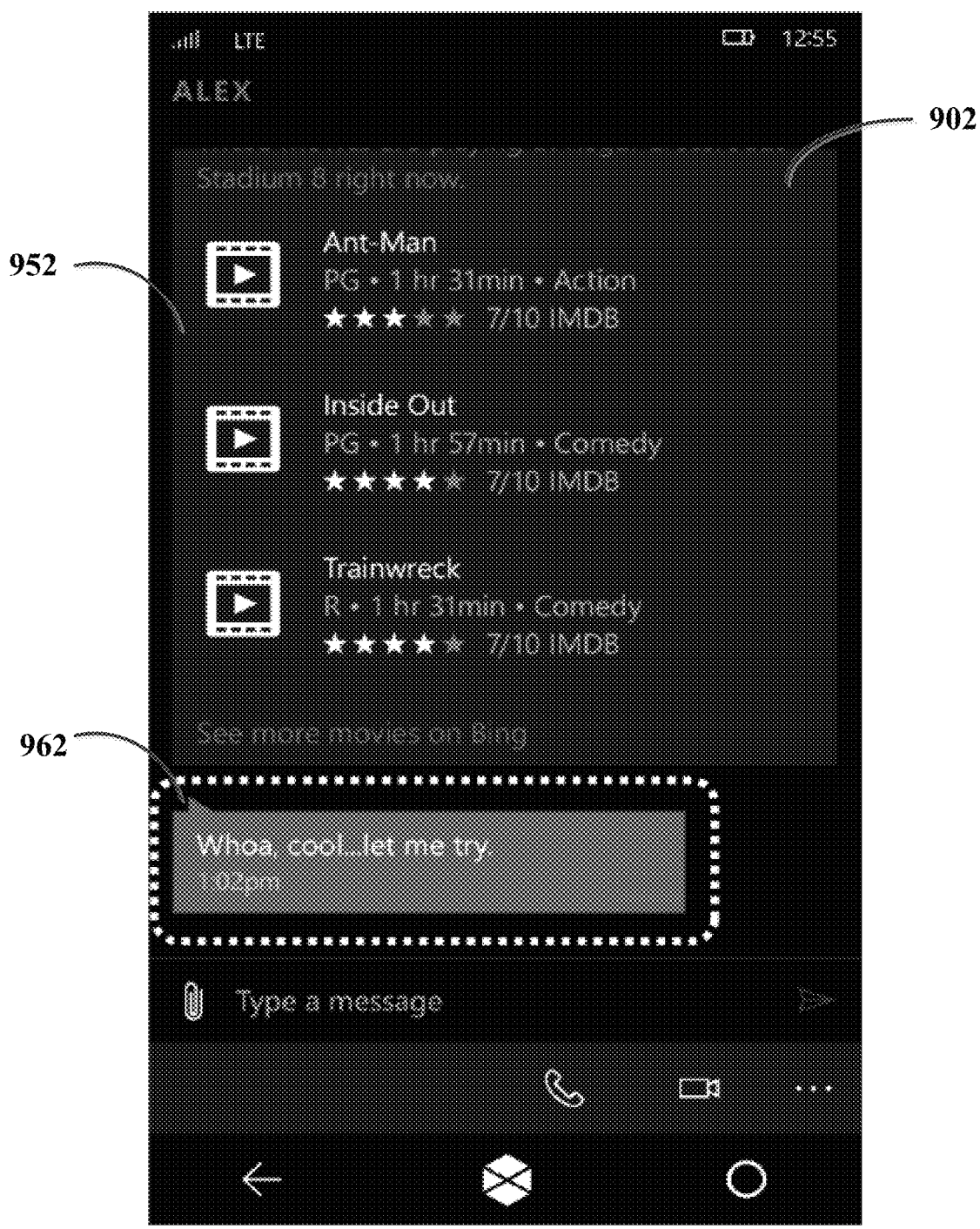
Figure 9G:
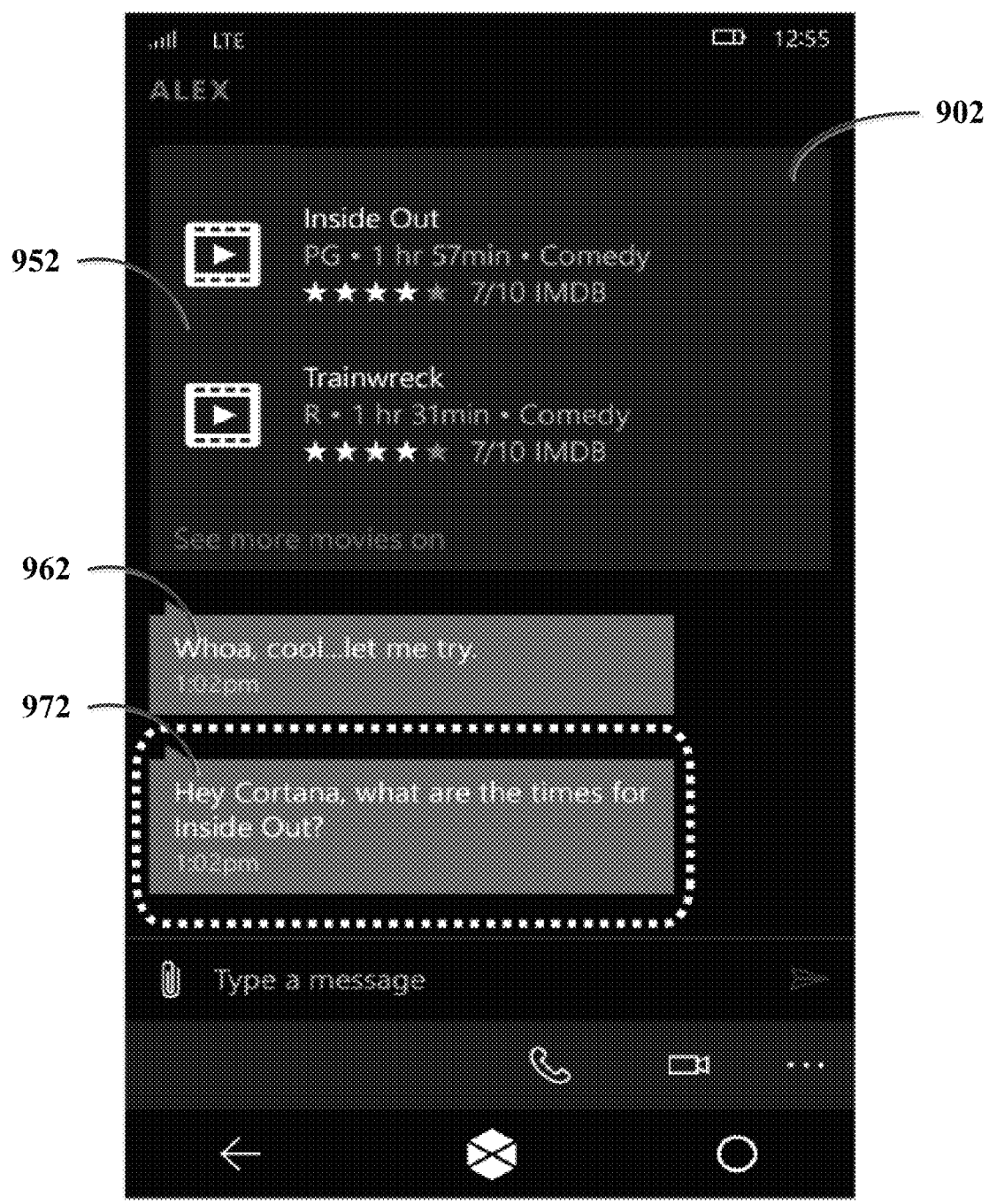
Figure 9H:
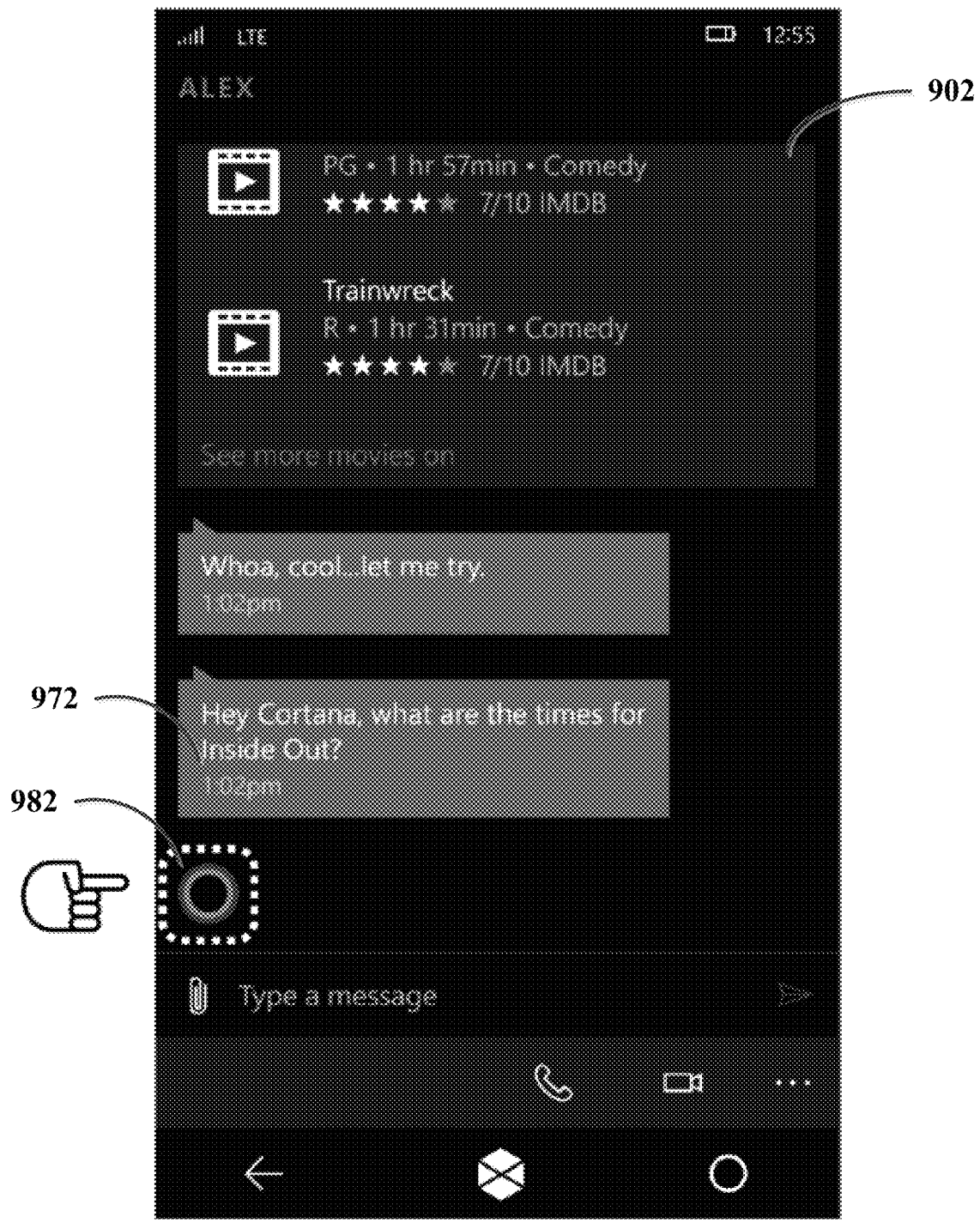
Figure 9I:
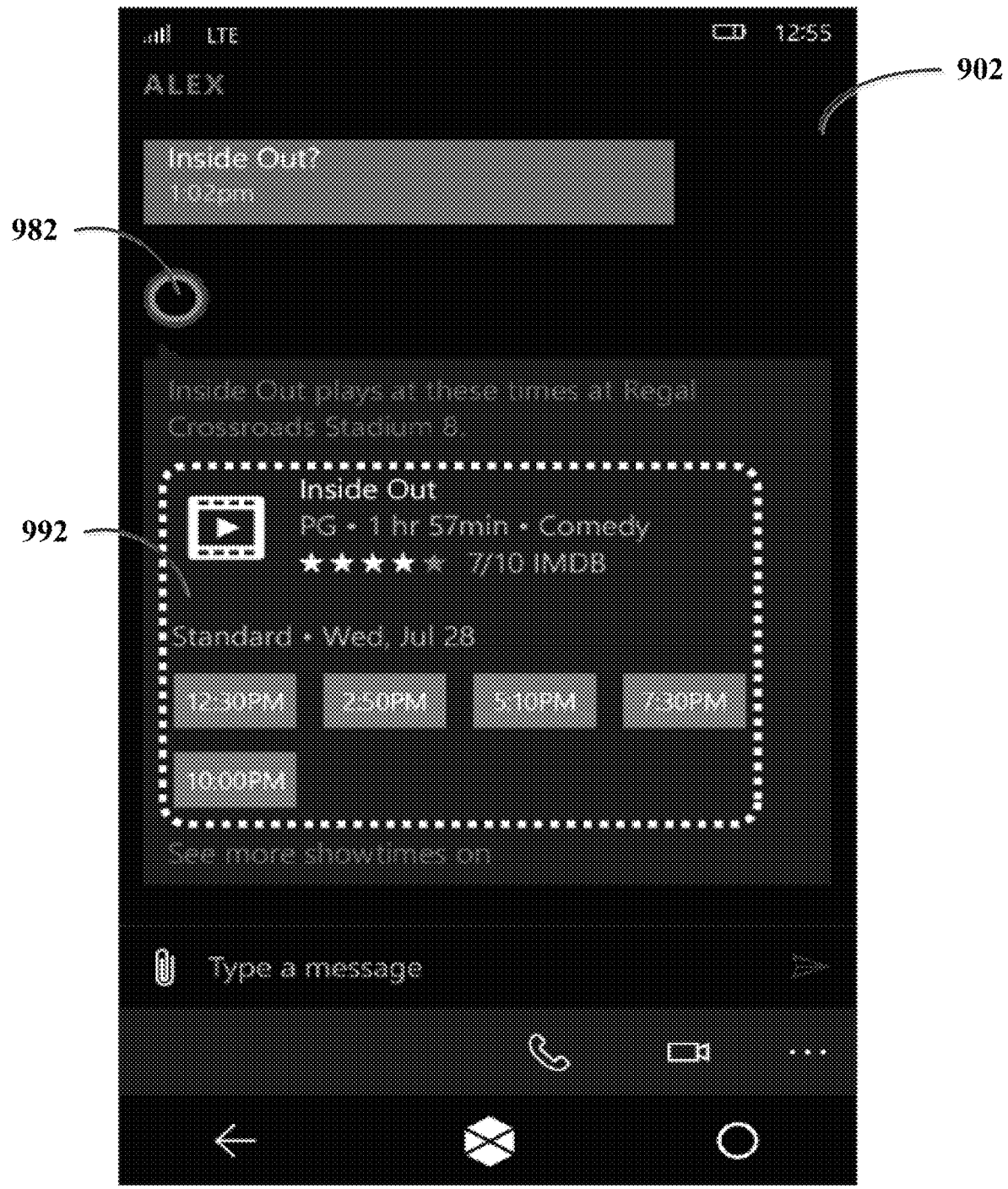
Figure 9J:
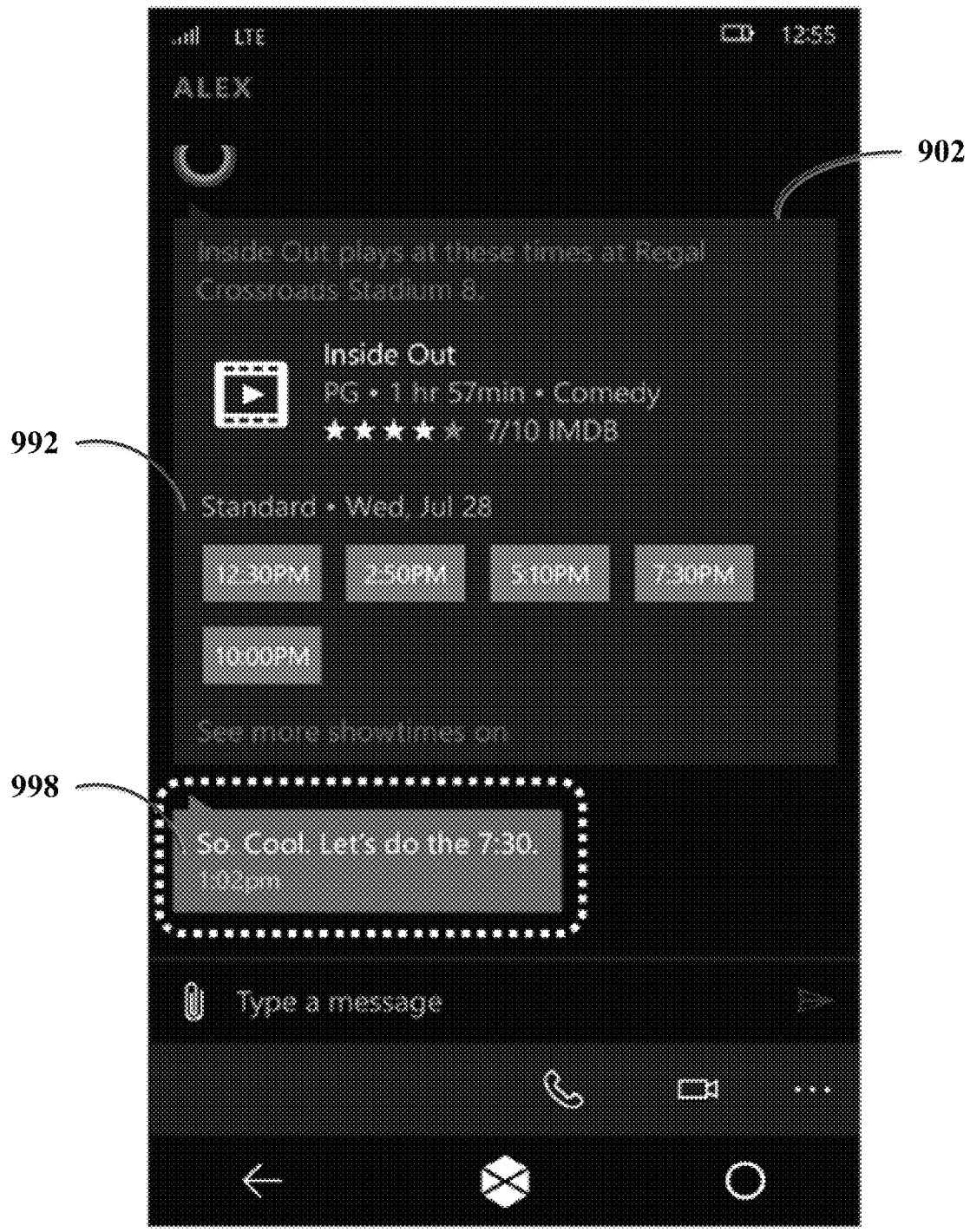

FIG. 6 is an exemplary method 600 for operations within an application executing upon a processing device with which aspects of the present disclosure may be practiced. As identified above, an exemplary temporal snapshot may be created from an exemplary social graph. As an example, method 600 may be executed by an exemplary processing device and/or system such as those shown in FIGS. 1-4. In one example, system 400 of FIG. 4 describes examples of components that may be used for implementation of method 600. In examples, method 600 may execute on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g., cloud service). Operations performed in method 600 may correspond to operations executed by a system and/or service that execute computer programs, application programming interfaces (APIs), or machine-learning processing, among other examples.

Method 600 begins at operation 602 where a query is entered into a message thread. The query may be entered through a processing device executing a messaging application. However, examples herein are not limited to a messaging application. As identified above, examples may be extended to work with any type of application and thread within an application. The query entered (operation 602) into the message thread may be a query directed to an intelligent personal assistant service. The query may comprise contact data that identifies the intelligent personal assistant service. For instance, a query may comprise a reference to the intelligent personal assistant service including but not limited to: a word, phrase, number, delimiter, and symbol, among other examples. In one example, a query entered into a message thread may be "Cortana, can you find me a restaurant in Seattle?" In other examples, contact data may be a phone number, email address, etc., associated with the intelligent personal assistance service.

Flow may proceed to operation 604, where an indication is received that the intelligent personal assistant service is added as an active participant in the message thread. In one example, receipt (operation 604) of the indication may comprise adding the intelligent personal assistant as a listed participant in the message thread. In another example, displaying, within the message thread, a notification that assistance is available from the intelligent personal assistant service. In some examples, an indication may be selectable such as a UI element or interactive link that highlights that the intelligent personal assistant service is actively involved in the message thread. In an alternative example, the intelligent personal assistant service may directly insert a response (possibly including retrieved content) within the message thread without providing an indication.

In some examples, flow may proceed to operation 606, where selection of the indication is provided by a processing device. In examples where a selectable indication is provided, a user (through a processing device) may select the received indication. This may trigger display of content, retrieved by the intelligent personal assistant service, within the message thread.

Flow may proceed to operation 608, where content, retrieved by the intelligent personal assistant service, is received. As an example, the content may be received and displayed, on a processing device, within a messaging application. In one example, the content is presented as a message draft. In another example, the content is inserted directly into the message thread. Content retrieved is presented in an exemplary cue. Examples of cues have been described in foregoing, among other portions of the Specification. In examples where the received content is not directly included within a message thread, flow may proceed to operation 610, where indication is provided to include the content within the message thread. Flow may proceed to operation 612, where content is displayed within the message thread.

Flow may proceed to decision operation 614, where a determination is made as to whether the message thread is still active. If the message thread is not active, flow branches NO, and method 600 remains idle until further message content is added to the message thread. In such a case, the intelligent personal assistant service remains running unless explicitly disabled by a user. In some examples, the intelligent personal assistant service (as an active participant) may transmit a message to the thread inquiring if further assistance is required. If it is determined (operation 614) that the message thread is active, flow branches YES and proceeds to operation 616. Indication that a message thread is still active may be a message received from a participant within the message thread. For instance, a user may transmit a follow-up message into the message thread. At operation 616, action is received indicating that the intelligent personal assistant service remains an active participant within the message thread. For instance, the intelligent personal assistant service may transmit a response to a message in the message thread. In other examples, the intelligent person assistant service may proactively transit a message that is added to the message thread. This may trigger further responses from other users. The intelligent personal assistant service may remain an active participant within the message thread until removed from the message thread. In one example, a user may remove the intelligent personal assistant service from the message thread, for example, by explicitly choosing to dismiss the intelligent personal assistant service. In such an instance, the intelligent personal assistant service may be configured to provide an indication (e.g., through message content, visual cues, etc.) that the service is/has been dismissed/muted/turned off and may not return until reactivated. In examples, the intelligent personal assistant, though not indicated as an active participant, may continue to monitor a thread (e.g., context of a message thread) and provide indication that the intelligent personal assistant service may be of assistance.

In an alternative example, the intelligent personal assistant service may remove itself from the message thread. For instance, the intelligent personal assistant service may proactively include, within the message thread, further message content indicating that the intelligent personal assistant service may not remain an active participant in the message thread. This may provide users of the message thread with an opportunity to request that the intelligent personal assistance service remain an active participant.

FIG. 7 is an exemplary method 700 for interaction of an exemplary intelligent personal assistant service which aspects of the present disclosure may be practiced. As an example, method 700 may be executed by an exemplary processing device and/or system such as those shown in FIGS. 1-4. In one example, system 400 of FIG. 4 describes examples of components that may be used for implementation of method 700. In examples, method 700 may be executed on a device comprising at least one processor configured to store and execute operations, programs or instructions. However, method 700 is not limited to such examples. In at least one example, method 700 may be executed (e.g., computer-implemented operations) by one or more components of a distributed network, for instance, web service/distributed network service (e.g., cloud service). Operations performed in method 700 may correspond to operations executed by a system and/or service that execute computer programs, application programming interfaces (APIs), or machine-learning processing, among other examples.

Method 700 begins at operation 702 where a query is received that is directed to an intelligent personal assistant service. As an example, a query may be entered into a thread such as a message thread of a messaging application, among other examples. Examples of a query directed to an intelligent personal assistant service are provided in the foregoing, including the description of FIG. 6.

Flow may proceed to operation 704, where an intelligent personal assistant service is added as an active participant in a thread (e.g., message thread). Examples of adding an intelligent personal assistant service to a thread are provided in the foregoing, including the description of FIG. 6.

Flow may proceed to operation 706, where message content is analyzed within a message thread. A message thread may be analyzed by an intelligent personal assistant service. Examples of analyzing message content within a message thread are provided in the foregoing, including the description of FIGS. 4-6.

Flow may proceed to operation 708, where an indication is provided that content is available from the intelligent personal assistant service. As an example, the indication may be provided by the intelligent personal assistance service. In another example, the indication may be provided by the messaging application. Examples of indications are provided in the foregoing, including the description of FIGS. 4-6. In examples where an indication is provided, flow may proceed to operation 710, where selection of an indication may be received. Selection of an indication may trigger display of retrieved content within a messaging application (either as a message draft or included directly within a message thread).

In any example, content (retrieved by the intelligent personal assistant service) may be displayed within a message thread of the messaging application. Flow may proceed to decision operation 714, where it is determined whether additional message content is added to a message thread. If not, flow branches NO and operation remains idle until update is made to the message thread. If message content of a message thread is updated, flow branches YES and processing returns to operation 706, where message content is re-analyzed. The intelligent personal assistant service is configured to proactively provide responses to additional method thread. In other examples, the intelligent personal assistant service may proactively provide additional message content within the message thread. This may trigger further interaction from other users associated with a message thread.

FIGS. 8A-8F are exemplary processing device views illustrating execution of a messaging application with which aspects of the present disclosure may be practiced. FIGS. 8A-8F provide visual depiction of examples described in the foregoing included in the description of at least FIGS. 4-7. As an example, processing device views shown in FIGS. 8A-8F may be displayed view on any of the processing devices shown in FIGS. 1-4 and described in the accompanying description.

Processing device view 800 (shown in FIG. 8A) illustrates display of a message thread 802 of a messaging application executing on a processing device. As shown in processing device view 800, a first message 804 is included within the message thread 802. The first message 804 includes message content of "up for grabbing a bite to eat tonight, somewhere in Ballard?" This may be message content received from another user. Processing device view 820 (shown in FIG. 8B) illustrates progression of message thread 802. A user of a processing device may enter message content responding to the first message 804. The second message 822 (shown as a message draft in processing device view 820) may comprise message content of "Yes! where?" Processing device view 830 illustrates that the second message 822 was sent by the user and included within the message thread 802.

The whole time, the intelligent personal assistant service is analyzing the message content within the message thread. Based on the first message 804 and the second message 822, the intelligent personal assistant service is able to provide assistance to the users of the message thread 802. As shown in processing device view 830 (FIG. 8C), an indication 832 is provided that alerts a user that assistance is available from the intelligent personal assistant service. In the example shown, a software navigation button is illuminated indicating to select the software navigation button of the processing device. Processing device view 840 (FIG. 8D) illustrates a progression illustrating what happens when a user selects indication 832. As shown in processing device view 840, selection of the software navigation button may a cue 842 to be inserted into the messaging application by the intelligent personal assistant service. The cue 842 comprises content retrieved by the intelligent personal assistant service. As shown in processing device view 840, cue 842 provides the retrieved content in a rich format. This includes links to restaurants near an entity of "Ballard" identified based on analysis of the message thread 802. However, in alternative examples, cue 842 may present content in a plaintext format. The cue 842 further comprises message content, for example, "I've found some Restaurants in Ballard that you might like." This is an example of the intelligent personal assistant service incorporating natural language processing operations when responding to users of message thread 802. The cue may further comprise additional content such as interactive links or commands that users may be able to click on in order to obtain additional content. Processing device view 840 illustrated cue 842 being presented as a message draft within the messaging application. For instance, cue 842 is presented in a composition module of the messaging application to allow the user to decide whether to send the cue 842, modify the cue 842, request additional support, etc. The user may provide input 844 selecting to send the message draft for inclusion within message thread 802.

Processing device view 850 (FIG. 8E) illustrates inclusion of the cue 842 as within the message thread 802 as a third message 852. As shown in processing device view 850, the third message 852 is presented in a rich format that includes links as provided to the user in cue 842. Processing device view 860 (FIG. 8F) illustrates a fourth message 862 responding to insertion of the retrieved content within the message thread.

FIGS. 9A-9J are exemplary processing device views illustrating an exemplary intelligent personal assistant as an active participant in an application with which aspects of the present disclosure may be practiced. FIGS. 9A-9J provide visual depiction of examples described in the foregoing included in the description of at least FIGS. 4-7. As an example, processing device views shown in FIGS. 9A-9J may be displayed view on any of the processing devices shown in FIGS. 1-4 and described in the accompanying description.

Processing device view 900 (shown in FIG. 9A) illustrates display of a message thread 902 of a messaging application executing on a processing device. As shown in processing device view 900, a first message 904 is received in the message thread of a messaging application. The first message 904 comprises message content of "Hey, you want to see a movie tonight?" Processing device view 920 (FIG. 9B) illustrates a user (through a processing device executing the messaging application) entering a draft of a second message 922. The user may select to send the draft of the second message 922. Processing device view 930 (shown in FIG. 9C) illustrated entry of the second message 922 in the message thread 902. As shown in processing device view 930, a user, through a processing device, may draft a query 932 that is directed to an intelligent personal assistant service. The query 932 may comprise message content of "Cortana, what movies are playing?"

Processing device view 940 (illustrated in FIG. 9D) illustrates the intelligent personal assistant service as an active participant within message thread 902. As shown in processing device view 940, query 932 is entered into message thread 902. The intelligent personal assistant service may process the query 932 as well as other related message content and signal data (from processing devices and/or users). The intelligent personal assistance service may provide indication 942 of being an active participant, for example, within the message thread 902.

Processing device view 950 (illustrated in FIG. 9E) highlights inclusion of a cue 952 within the messaging application. For instance, in response to a user providing input selecting indication 942, a message draft of cue 952 may be displayed. In the example show, cue 952 comprises retrieved content presented in a rich format. However, in alternative examples, cue 952 may include content presented in a plaintext format. For instance, another user and processing device may be executing a different messaging application upon a different type of processing device that may not have capability to receive content in a rich format. Processing device view 950 further illustrates selection of a UI element 954 indicating to transmit cue 952 as message content within message thread 902. In alternative examples, cue 952 may be inserted directly into message thread 902.

Processing device view 960 (illustrated in FIG. 9F) highlights cue 952 being inserted into message thread 902. As shown in processing device view 960, cue 952 is visible to multiple users of message thread 902. In response to the cue 952 being provided within message thread 902, another user may provide a response, third message 962. Third message 962 comprises message content of "Whoa, cool . . . let me try," acknowledging presence of the intelligent personal assistant service within the message thread 902.

In processing device view 970 (illustrated in FIG. 9G), a second query 972 directed to the intelligent personal assistant service is included in the message thread 902. The second query 972 may be sent from a processing device of a remote user associated with message thread 902. The second query 972 includes message content of "Hey Cortana, what are the times for Inside Out?" The intelligent personal assistant service may process the query 972 as well as other related message content and signal data (from processing devices and/or users). As shown in processing device view 980 (illustrated in FIG. 9H), the intelligent personal assistance service may provide indication 982 of being an active participant, for example, within the message thread 902. A user may provide input selecting indication 982.

Processing device view 990 (illustrated in FIG. 9I) highlights display of a second cue 992 in message thread 902. The second cue 992 may be displayed in message thread 902 in response to receiving the input selecting indication 982. Processing device view 995 (illustrated in FIG. 9J) illustrates a user message responding to the inclusion of the second cue 992 within message thread 902. As shown in processing device view 995, a fourth message 998 includes message content of "So Cool. Let's do the 7:30" acknowledges receipt of the content (in the second cue 992) from the intelligent personal assistant service.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    receiving a query directed to an intelligent personal assistant service in a message thread of a messaging application, wherein the message thread includes messages from a plurality of users in a conversation;
    receiving contact data that identifies the intelligent personal assistant service for adding the intelligent personal assistant service as an active participant in the conversation in the messaging application;
    receiving, within the message thread, an indication that the intelligent personal assistant service is added as an active participant in the conversation in the messaging application;
    receiving a query result from the intelligent personal assistant service directly into the messaging application;
    displaying the query result from the intelligent personal assistant service in the messaging application, but not in the message thread;
    providing an input indicating to include the query result from the intelligent personal assistant service within the message thread; and
    in response to the input, inserting the query result directly into the message thread, wherein the query result inserted into the message thread is the same as the query result displayed in the messaging application and received from the intelligent personal assistant service.

2. The method according to claim 1, wherein the query is entered using a processing device executing the messaging application, and wherein the query comprises contact data that identifies the intelligent personal assistant service.

3. The method according to claim 1, wherein the indication comprises at least one selected from a group consisting of: presenting the intelligent personal assistant as a listed participant in the message thread and displaying, within the message thread, a notification that assistance is available from the intelligent personal assistant service.

4. The method according to claim 1, further comprising providing, using a processing device, selection of the indication, wherein the query result is received within the messaging application in response to selection of the indication.

5. The method according to claim 1, wherein the received query result is displayed in at least one of a format selected from: a rich format and a plaintext format.

6. The method according to claim 1, wherein the receiving of the query result from the intelligent personal assistant service further comprises receiving the query result within a message draft that is editable for inclusion within the message thread.

7. The method according to claim 1, further comprising transmitting a message for inclusion within the message thread, and proactively receiving, from the intelligent personal assistant service, a response to the message.

8. The method according to claim 1, further comprising receiving a message within the message thread from another processing device, and receiving, from the intelligent personal assistant service, a response to the message within the message thread.

9. A method comprising:
receiving a query directed to an intelligent personal assistant service in a message thread of a messaging application, wherein the message thread includes messages from a plurality of users in a conversation and wherein the query comprises contact data that identifies the intelligent personal assistant service;
in response to receiving the query, adding the intelligent personal assistant service as an active participant within the message thread;
providing, within the message thread, an indication that content is available from the intelligent personal assistant service;
receiving a command indicating to include the content from the intelligent personal assistant service within the messaging application;
displaying the content in the messaging application, but not in the message thread;
providing an input indicating to include the content within the message thread; and
in response to receiving the input inserting the content directly into the message thread, wherein the content inserted into the message thread is the same as the content displayed in the messaging application and received from the intelligent personal assistant service.

10. The method according to claim 9, wherein the content is displayed within the messaging application in response to the command being received.

11. The method according to claim 9, wherein the query comprises contact data that identifies the intelligent personal assistant service, and the contact data is used to involve the intelligent personal assistant service as the active participant.

12. The method according to claim 9, wherein the content is displayed in at least one of a format selected from: a rich format and a plaintext format.

13. The method according to claim 9, further comprising identifying additional message content within the message thread, re-analyzing the message thread, and proactively providing, within the message thread, a response to the additional message content.

14. The method according to claim 13, wherein the query is initiated by a first processing device and the additional message content is received from a second processing device, and wherein the re-analyzing analyzes context of the message thread and signal data of the first processing device and the second processing device to generate the response.

15. A system comprising:
at least one processor; and
a memory, operatively connected with the at least one processor, that stores computer-executable instructions, which when executed on the at least one processor causes the at least one processor to:
receive a search query directed to an intelligent personal assistant service in a message thread of a messaging application, wherein the message thread including messages from a plurality of users in a conversation and wherein the query comprises contact data that identifies the intelligent personal assistant service;
in response to receiving the search query, add the intelligent personal assistant service as an active participant within the message thread;
provide, within the message thread, an indication that a search result is available from the intelligent personal assistant service;
receive a command indicating to include the search result from the intelligent personal assistant service within the messaging application;
display the search results in the messaging application, but not in the message thread;
receive an input indicating to include the search results within the message thread; and
in response to the input, insert the search result directly into the message thread, wherein the search result inserted into the message thread is the same as the search result displayed in the messaging application and received from the intelligent personal assistant service.

16. The system according to claim 15, wherein the search result is displayed within the messaging application in response to the command being received.

17. The system according to claim 15, wherein the query comprises contact data that identifies the intelligent personal assistant service, and the contact data is used to involve the intelligent personal assistant service as the active participant.

18. The system according to claim 15, wherein the search result is displayed in at least of a format selected from: a rich format and a plaintext format.

19. The system according to claim 15, wherein the computer-executable instructions further cause the at least one processor to: identify additional message content within the message thread, re-analyze the message thread, and proactively provide, within the message thread, a response to the additional message content.

20. The system according to claim 15, wherein the query is initiated by a first processing device and the additional message content is received from a second processing device, and wherein the re-analyzing of the message thread comprises analyzing context of the message thread and signal data of the first processing device and the second processing device to generate the response.

* * * * *